United States Patent
Kim et al.

(10) Patent No.: US 11,346,765 B2
(45) Date of Patent: May 31, 2022

(54) ACCELERATED OUTDOOR EXPOSURE TEST EQUIPMENT

(71) Applicant: Korea Conformity Laboratories, Seoul (KR)

(72) Inventors: Chang Hwan Kim, Chungcheongbuk-do (KR); Sun Woong Choi, Daejeon (KR)

(73) Assignee: Korea Conformity Laboratories, Seoul (KR)

( * ) Notice: Subject to any disclaimer, the term of this patent is extended or adjusted under 35 U.S.C. 154(b) by 72 days.

(21) Appl. No.: 16/576,628

(22) Filed: Dec. 30, 2019

(65) Prior Publication Data

US 2020/0182775 A1   Jun. 11, 2020

(30) Foreign Application Priority Data

Sep. 19, 2018 (KR) .................... 10-2018-0112329
Dec. 26, 2018 (KR) .................... 10-2018-0169734

(51) Int. Cl.
*G01N 17/00* (2006.01)

(52) U.S. Cl.
CPC .......... *G01N 17/004* (2013.01); *G01N 17/002* (2013.01)

(58) Field of Classification Search
CPC ..... G01N 17/00; G01N 17/002; G01N 17/004
See application file for complete search history.

(56) References Cited

U.S. PATENT DOCUMENTS

| | | | | |
|---|---|---|---|---|
| 2,945,417 A | * | 7/1960 | Caryl ................ | F24S 23/80 126/600 |
| 3,202,811 A | * | 8/1965 | Hall, Jr. ............ | F21S 8/006 362/2 |
| 3,488,681 A | * | 1/1970 | Masakatsu ........ | G01N 17/00 374/57 |
| 3,889,531 A | * | 6/1975 | Suga ................. | G01N 17/00 73/150 R |
| 4,391,522 A | * | 7/1983 | Schmid ............. | G01J 3/02 356/326 |
| 4,807,247 A | * | 2/1989 | Robbins, III ..... | G01N 17/00 236/DIG. 6 |
| 4,817,447 A | * | 4/1989 | Kashima ........... | G01N 17/00 374/57 |

(Continued)

FOREIGN PATENT DOCUMENTS

| | | |
|---|---|---|
| JP | H06229905 A | 8/1994 |
| JP | 2001183286 A | 7/2001 |

(Continued)

OTHER PUBLICATIONS

First Office Action in corresponding KR Patent Application No. 10-2019-0115570, dated Nov. 24, 2020, and English Translation thereof, 6 total pages.

*Primary Examiner* — Natalie Huls
(74) *Attorney, Agent, or Firm* — Armstrong Teasdale LLP

(57) ABSTRACT

Accelerated outdoor exposure test equipment is disclosed. In the accelerated outdoor exposure test equipment, a specimen is moved for an accelerated outdoor test or an artificial radiation source to irradiate artificial light is moved at sunrise or sunset. Accordingly, the specimen is exposed to natural light such as sunlight during daytime and exposed to artificial light during nighttime.

16 Claims, 19 Drawing Sheets

(56) References Cited

U.S. PATENT DOCUMENTS

| | | | | |
|---|---|---|---|---|
| 5,136,886 A * | 8/1992 | Neigoff | G01N 17/004 356/246 |
| 5,206,518 A * | 4/1993 | Fedor | G01N 17/004 250/492.1 |
| 5,305,634 A * | 4/1994 | Suga | G01N 17/00 73/856 |
| 6,073,500 A * | 6/2000 | Jorgensen | G01N 17/004 126/573 |
| 6,285,137 B1 | 9/2001 | Grossman et al. | |
| 6,466,313 B1 | 10/2002 | Bernatek et al. | |
| 6,533,452 B1 * | 3/2003 | Hardcastle, III | G01N 17/00 374/5 |
| 6,626,052 B1 * | 9/2003 | Martin | G01N 17/004 250/228 |
| 6,720,562 B2 * | 4/2004 | Rathod | A45C 7/0095 250/252.1 |
| 6,872,936 B2 | 3/2005 | Rathod et al. | |
| 6,892,591 B2 | 5/2005 | Grossman et al. | |
| 7,013,742 B2 * | 3/2006 | Beraud | G01N 17/004 250/492.1 |
| 7,174,781 B2 * | 2/2007 | Webb | G01N 17/004 73/170.16 |
| 7,417,728 B2 * | 8/2008 | Hardcastle | G01J 1/04 356/300 |
| 8,156,830 B2 * | 4/2012 | Kaji | G01N 17/004 73/865.8 |
| 8,225,682 B2 * | 7/2012 | Schultz | G01N 17/004 73/865.6 |
| 8,670,938 B2 * | 3/2014 | Hardcastle, III | G01N 17/002 702/3 |
| 9,377,391 B2 * | 6/2016 | Schoenlein | G01N 17/002 |
| 2005/0120811 A1 * | 6/2005 | Hardcastle, III | G01N 17/004 73/865.6 |
| 2007/0034026 A1 * | 2/2007 | Maciver | G01N 17/002 73/865.6 |
| 2007/0295115 A1 * | 12/2007 | Hardcastle | G01N 17/002 73/866 |
| 2010/0005911 A1 * | 1/2010 | Scott | G01N 17/002 73/865.6 |
| 2010/0154571 A1 * | 6/2010 | Yun | G01N 17/002 73/865.6 |
| 2011/0061477 A1 * | 3/2011 | Fitz | G01N 17/002 73/865.6 |
| 2012/0033424 A1 * | 2/2012 | Yen | F21V 29/83 362/249.02 |
| 2016/0363525 A1 * | 12/2016 | Friedersdorf | G01N 27/023 |
| 2021/0080376 A1 * | 3/2021 | Srinivasan | G01N 17/00 |

FOREIGN PATENT DOCUMENTS

| | | |
|---|---|---|
| JP | 2003149127 A | 5/2003 |
| KR | 1020170039779 A | 4/2017 |
| KR | 1020180013834 A | 2/2018 |
| WO | 2019117386 A1 | 6/2019 |

* cited by examiner

ACCELERATED OUTDOOR EXPOSURE TEST EQUIPMENT

CROSS-REFERENCE TO RELATED APPLICATION(S)

This application claims the benefit of Korean Patent Application No. 10-2018-0112329, filed on Sep. 19, 2018, Korean Patent Application No. 10-2018-0169734, filed on Dec. 26, 2018, and Korean Patent Application No. 10-2019-0115570, filed on Sep. 9, 2019, in the Korean Intellectual Property Office, the disclosures of which are incorporated herein by reference.

BACKGROUND

1. Field of the Invention

Example embodiments relate to accelerated outdoor exposure test equipment, and more particularly to equipment for testing for specimen degradation using natural light such as the sunlight during a daytime period, and for testing for the specimen degradation using artificial light during a nighttime period.

2. Description of the Related Art

Conventionally, a polymer product formed of plastic requires a test for a degradation test by natural light, such as sunlight by exposing the polymer product outdoors for a specific time.

However, the time of daylight is limited for a day, testing, so testing the sample only using natural light prolongs a test time.

SUMMARY

An aspect provides accelerated outdoor exposure test equipment to expose a specimen to natural light during the daytime, and to expose the specimen to artificial light during the nighttime.

According to an aspect, accelerated outdoor exposure test equipment may include a test chamber consists of a box comprising an artificial radiation source; and a specimen holder which is disposed a specimen, wherein the specimen placed in the specimen holder is exposed to sunlight during daytime and exposed to artificial light of the artificial radiation source during nighttime.

The specimen may include a product formed of a polymer material or a portion of the product.

The specimen placed in the specimen holder may be exposed to the sunlight or the artificial light, as the specimen holder is moved in a lateral direction or a longitudinal direction at sunrise or sunset.

The specimen placed in the specimen holder is exposed to natural weathering or laboratory weathering depending on exposure stages expressed in terms of a total solar or solar ultraviolet irradiation.

The accelerated outdoor exposure test equipment further comprises a sun tracking device configured to change the accelerated outdoor exposure test equipment from a daylight exposure to an artificial exposure.

The accelerated outdoor exposure test equipment further comprises a humidity controller for the test chamber; or a water spray device configured to spray water on a surface of the specimen The test chamber includes a screen to prevent bugs from the artificial radiation source.

The test chamber or the specimen holder may be moved depending on exposure cycle to natural light and the artificial light such that the specimen is exposed to the natural light and the artificial light.

The test chamber is disposed on an actuator moving along an axis or disposed on a tracking actuator to move the specimen holder in a lateral/longitudinal direction.

The artificial radiation source is disposed to provide maximum exposure uniformity.

The artificial radiation source may include a metal halide lamp or an UVA-340 lamp.

The accelerated outdoor exposure test equipment may further comprise a radiometer, a black-standard thermometer; or a black-panel thermometer.

The specimen holder is in forms of an open rack, leaving the backs of the specimens exposed or to provide the specimens with a solid backing, and the specimen holder is made of non-oxidizing alloys of aluminum or stainless steel.

The air temperature is monitored during an accelerated outdoor exposure test, the air temperature is controlled as not exceeding a specific temperature above 38° C., and when the artificial radiation source is disposed in front of the specimen.

According to another aspect, accelerated outdoor exposure test equipment may include a specimen holder which is disposed in an artificial radiation source to irradiate artificial light, and a motor to operate the specimen holder. The motor may transfer the specimen holder in a first direction, in which a specimen to be tested is placed, such that the specimen is exposed to the artificial light at sunset, and may transfer the specimen holder in a second direction different from the first direction such that the specimen holder is exposed to sunlight instead of the artificial light at sunrise.

According to another aspect, accelerated outdoor exposure test equipment may include a specimen holder consists of a box comprising artificial radiation source; a specimen holder which is disposed a specimen for an accelerated outdoor exposure test; and a motor to operate the specimen holder, wherein the motor is controlled to move the specimen holder towards a test chamber, such that the specimen is exposed to artificial light irradiated from the artificial radiation source at sunset, and wherein the motor is controlled to move the specimen holder out of the test chamber, such that the specimen holder is exposed to sunlight instead of the artificial light at sunrise.

The accelerated outdoor exposure test equipment may further include a water spray device configured to provide water to the specimen of the specimen holder.

The specimen holder may be titled at a specific angle during daytime, moved to be positioned on a plane at sunset, and then moved towards a test chamber after positioned on the plane.

The specimen holder is positioned inside the test chamber during nighttime, moved out of the test chamber at sunrise, and then tilted at a specific angle from a plane state after moved out of the test chamber.

As described above, according to an example embodiment, in the accelerated outdoor exposure test equipment, the specimen may be moved for the accelerated outdoor exposure test at sunset or the sunrise time, or the artificial radiation source is moved to radiate the artificial light, thereby exposing the specimen to natural light, such as sunlight, during the daytime and exposing the specimen to the artificial light during the nighttime.

According to an example embodiment, in the accelerated outdoor exposure test equipment, when the exposure test is performed with respect to the specimen, the same environment is substantially provided during the daytime and the nighttime, thereby enhancing the reliability for the exposure test.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
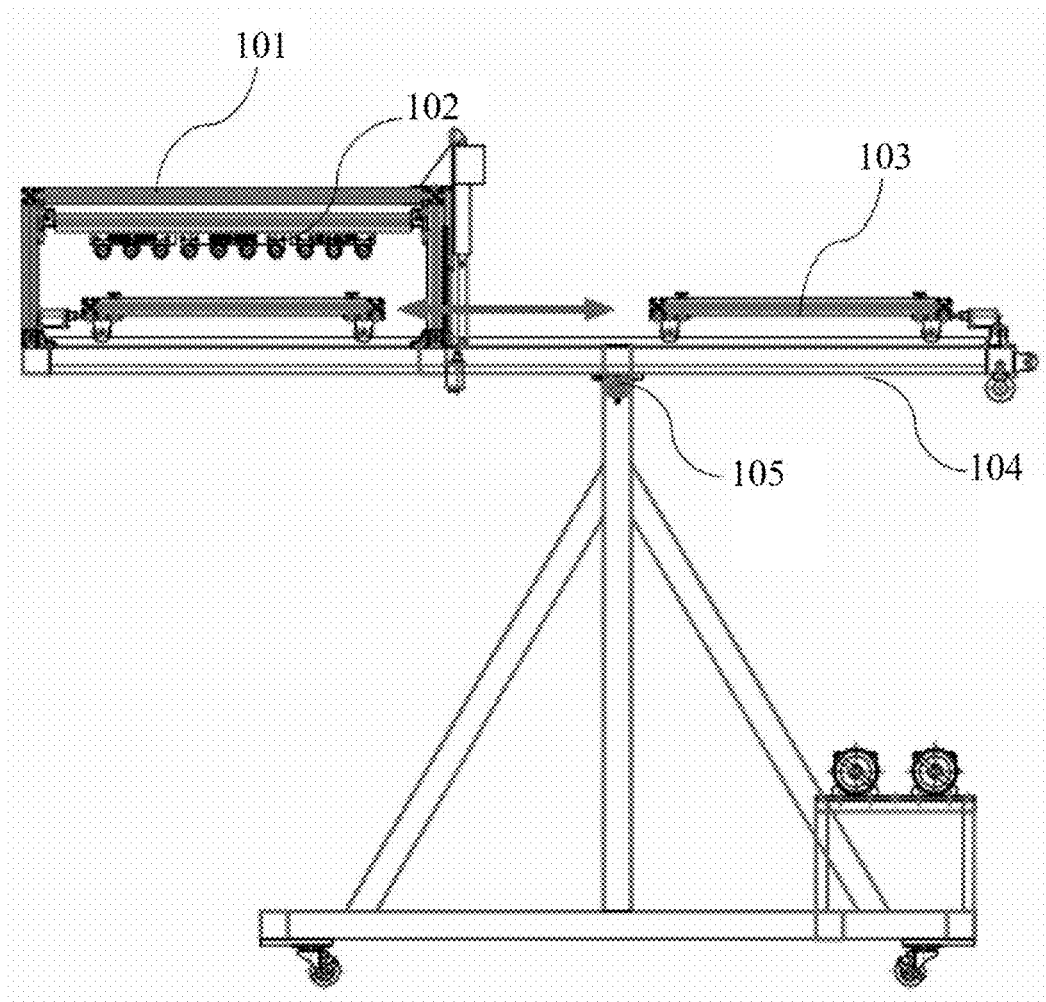
FIG. 1 is a front view of accelerated outdoor exposure test equipment according to a first embodiment.

Hereinafter, an example embodiment will be described with reference to accompanying drawings.

The performance of polyolefine plastic exposed outdoors and products formed of polyoefine plastic may be degraded due to various environmental factors such as UV irradiation, heat, humidity, acid rain, or the like. Accordingly, therefore the estimation of the lifetime is an important consideration in designing against performance degradation of materials and products for the outdoor use. Although an outdoor exposure test method provides degradation caused by the actual environmental factors, it carries a disadvantage of requiring a prolonged testing period.

To the contrary, although a laboratory radiation source using artificial irradiation is convenient, it takes time to generate various factors that contribute to the degradation of a material or product, and it is difficult to analyze lifetime. Accelerated outdoor test methods are also available. In all cases these methods are often not effective in regions much affected by the large volume of the cloud cover. As a survey is taken from 150 experts from the Climate Experts Committee, many respondents agreed on the need for accelerated outdoor test methods that are appropriate for local climates, such as cloudy areas.

In other words, there has been developed an accelerated outdoor exposure standard having the advantages of the outdoor exposure to make real environmental exposure and the advantage of reducing the exposure time using artificial light. There has been developed a method for providing continuously and sequentially accelerated outdoor exposure by exposing specimens outdoors during the daytime and exposing the specimens to the artificial light during the nighttime.

An example embodiment provides accelerated outdoor exposure test equipment for a method for exposing plastic through the combination of natural irradiation and artificial irradiation.

An example embodiment provides a method for exposing a specimen into the outdoor exposure in daytime and exposing the specimen on the artificial irradiation in nighttime. The accelerated outdoor exposure method is a method for exposing specimen to alternating outdoor weathering and artificial radiation source. This method of exposure is designed to provide accelerated outdoor exposure using as much as possible the natural outdoor exposure which are then assisted by the artificial irradiation during night time and in cloudy conditions. An example embodiment may be applicable to various plastic products as well as a material, such as polyolefin.

<Accelerated Outdoor Exposure>

The accelerated outdoor exposure may be provided through subsequent exposure under a natural climate and an artificial climate. Natural outdoor exposure is performed during the daytime, and artificial irradiation is performed during the nighttime. The accelerated outdoor exposure method is to combine both, the natural weathering (to solar radiation) and the laboratory weathering/irradiation.

According to an example embodiment, exposure may be performed at a continuous cycle outdoors through natural exposure (natural weathering) based on natural irradiation, such as solar irradiation, and laboratory weathering/irradiation. Specimens prepared from the material or specimens extracted from portions of the product or the whole product are exposed outdoors through solar irradiation during the daytime, and the specimens are continuously exposed through artificial irradiation having various factors. This combination may be applied to an environment which is not effective, as cloud interrupts the direct solar irradiation.

After exposures are combined at time intervals, the specimens are removed from the exposure and tests are performed with respect to changes in visual attributes, mechanical or optical attributes, or other attributes of interest. The exposure stage may be provided at the given time interval or may be expressed as a term such as "Total Solar" or "Solar Ultraviolet Irradiation Radiant Exposure". In general, Sun tracking may be used in automated devices to change from solar exposure to artificial exposure.

<Accelerated Outdoor Exposure Test Equipment>

According to an example embodiment, the accelerated outdoor exposure test equipment may include components capable of controlling a temperature. Day and night occur automatically according to the sunrise and sunset times of the sun. The design of the apparatus may vary, but it shall be constructed from an inert material and provide uniform irradiance in accordance with ISO 4892-1, along with means for controlling the temperature. In general, Day and night will automatically operate according to sunrise and sunset time, and cloudy, rain condition will operate either manually or automatically depending on the equipment available.

In addition, the accelerated outdoor exposure test equipment may include the equipment for sun-tracking or humidity control of test chamber or spraying water on the specimen surface or occurrence of condensation.

(1) Test Chamber

According to an example embodiment, the accelerated outdoor exposure test equipment may include a test chamber. The test chamber may consists of a box containing artificial radiation sources and a screen to prevent bugs from being gathered around the artificial radiation source during the nighttime. The test chamber may be positioned on an actuator moving along an axis or a tracking actuator to move a specimen holder (sample holder) in a lateral/longitudinal direction. The box is made to allow specimen exposure to daylight and artificial radiation source by a simple movement at each exposure cycle. The artificial radiation source may be disposed to provide the maximum exposure uniformity.

(2) Laboratory Radiation Source

In the example embodiment, a laboratory radiation source or a laboratory artificial radiation source may correspond to an artificial radiation source or an artificial light, which corresponds to sunlight that is natural light. Any laboratory radiation source specified in ISO 4892-3 (for simulation of global solar radiation) and a metal halide radiation source specified in IEC 60068-2-5 (for simulation of global solar radiation) may be used for the simulation of global solar radiation. Irradiation uniformity may meet the requirements specified in ISO-4892-1. ISO 4892-1 reads that the repositioning of a specimen is periodically required when radiation within the exposure area is less than 90% of the peak radiation being described.

(i) Metal Halide Lamp

The tolerance of spectral radiation of a metal halide radiation source is similar to that of global solar radiation. The radiation between 280 nm and 3000 nm should be greater than 1000 W/m$^2$ and less than 1200 W/m$^2$.

(ii) Fluorescent UVA-340 Lamp

The UVA-340 radiation source meets ISO 4892-3. The fluorescent UVA 340 arc lamps do not simulate full global solar radiation. In global solar radiation, only short wavelength UV radiation of up to 360 nm is properly simulated.

(3) Radiometer

When the radiometer is used, the radiometer meets the requirements of ISO 9370.

(4) Black-Standard/Black-Panel Thermometer

The black standard thermometer or black panel thermometer meets the requirements of ISO 4892-1.

(5) Specimen Holder

A specimen holder may be in the form of an open rack, leaving the backs of the specimens exposed. The specimen holder may be made to provide the specimens with a solid backing. The specimen holder may be formed of inert materials having no influence on the exposing result. For example, the non-oxidizing alloy of aluminum or stainless steel is an inert material. Brass, carbon steel or copper should not be used in the vicinity of the test specimens. When there is a space between backing and the test specimen, the backing may effect on the exposure result. This in particular is of concern with transparent specimens, and the use is agreed on between the interested parties.

(6) Apparatus to Assess Change in Property

To monitor the change in property, when there are international standards in relation to the determination of the selected property (especially ISO 4582), an apparatus specified through the international standards has to be used.

<Test Specimen>

A test specimen may be employed as that in ISO 4892-1. The typical maximum size of the test specimen in the sheet shape is 70 mm×150 mm.

<Test Condition>

(1) Radiation

Unless otherwise specified, an irradiance level may be controlled at levels shown in tables 1 and 2. Other irradiance levels may be used. The measured irradiance and passband have to be in the test report.

(2) Relative Humidity of Air Inside Test Chamber

The specimen may be exposed under the condition that relative humidity is changed without controlling or under the condition that the relative humidity is controlled to be a specified level.

(3) Temperature (i) Black Standard Temperature and Black Panel Temperature

These should be set as specified in ISO 4892-2 for simulation of Global Solar Radiation.

(ii) Surface Temperature

The surface temperature should be measured through the rear surface of the specimen and be monitored during the test.

(iii) Air temperature

The air temperature should be monitored during the test. When a laboratory radiation source is irradiated in front of a specimen in the test chamber including the laboratory radiation source, the air temperature should not exceed the range of 38° C. to 4° C.

(4) Tracking System

The test equipment should have a system to sustain a target all the day.

(5) Set Sunrise Time and Sunset Time

A sunrise time and a sunset time should be set in an exposed area.

(6) Exposure Condition

The exposure condition should satisfy the exposure cycle in table 1.

TABLE 1

| | | Radiation[2] | | | | |
|---|---|---|---|---|---|---|
| Cycle No. | Exposure period[1] | Total Irradiance (285 nm to 3000 nm) [MJ/m$^2$] | UV Irradiance (280 nm to 400 nm) [MJ/m$^2$] | Black-panel temperature (BPT)[3] [° C.] | White-panel temperature (WPT)[3] [° C.] | Relative Humidity [%] |
| 1 | According to latitude | According to latitude | | max. Temperature | max. Temperature | Not controlled |

Method A - Exposures using solar radiation(natural weathering)

The outdoor exposure times should be set considering the sunrise and sunset times depending on the locations and latitude.

A sun tracking manner may be set and the radiant exposure during the daytime should be monitored using a pyranometer. In addition, the UV radiant exposure should be collected.

The humidity does not need to be controlled, but should be recorded.

TABLE 2

| | | Irradiance | | Chamber air temperature (CAT) [° C.] | Black-panel temperature (BPT) [° C.] | White-panel temperature (WPT) [° C.] | Relative humidity [%] |
|---|---|---|---|---|---|---|---|
| No. | Radiation source | Broadband [W/m$^2$·nm] | Narrowband [W/m$^2$·nm] | | | | |
| 1 | UVA-340 | | 0.76 W/m$^2$ at 340 nm | Not controlled However, shall not exceed above 42 C. | max. Temperature | max. Temperature | Not controlled |
| 2 | Metal Halide[1] | 1000 W/m$^2$ at (280 nm to 3000 nm) | | Not controlled However, shall not exceed above 42 C. | max. Temperature | max. Temperature | Not controlled |

A filter to simulate global solar irradiation should be used.

The humidity does not need to be controlled, but should be recorded.

<Procedure>

At least three specimens should be exposed with respect to each material evaluated in each test such that the statistical evaluation for the result is possible.

(1) Conditioning

Test specimens should be stored for 24 hours at 23±2° C. before testing is performed.

(2) Mounting of Test Specimens

The specimen should be fixed flat on the specimen holder. Other applicable matters should comply with ISO 4892-1 and ISO 877-1.

(3) Exposure

A specimen should be exposed in a place, in which the exposure is performed, during daytime and nighttime.

(4) Radiation Exposure Measurement

When a radiometer is used, the radiometer may be mounted on the surface, which is exposed, of a test specimen to display the radiation exposure. The exposure interval should be indicated in relation to radiation energy per unit area of the exposed surface) [J/(m$^2$·nm)] at a wavelength (e.g., 340 nm) selected from the range of 295 nm to 385 nm.

(5) Determination of Change in Properties after Exposure

The change in properties after exposure should be determined in a specific type in ISO 4582.

<Test Report>

Following information should be included in a test report.

(1) Details of a Specimen(=Sample) Provided by a User or Body Requesting a Test full description of specimen and an origin thereof In the proper case, compounding details including a cure time and a temperature (2) Preparation Method of Test Specimen (3) Used Exposure Method Daytime ISO 877-2:2009—Method A (Open-backed)

Nighttime: ISO 4892-3 (UVA 340) or IEC 60068-2-5 (metal halide)

(4) Details of Exposure

Exposed side (e.g., an tilt and an azimuth orientation)

Additional details, such as a location (if necessary, details, such as a latitude, a longitude, and altitude, of an exposed place).

Climate class and type

Natures of masking, backing support and attachments

Procedures used to determine the exposure stages, as required by a user or body requesting a test The outdoor exposure time is set considering the sunrise time and sunset time depending on the region and latitude.

Total solar radiant exposure measured according to ISO 9370, if necessary.

If necessary, the details of a cycle of spraying water and the procedure used for a temperature and/or irradiance control.

Details of Specimen washing (5) Test Result

An employed exposure stage, the corresponding interval between a time point, in which specimens are removed from an exposure test, and a time point to measure properties, and a whole time interval between a time point in which specimens are removed from the exposure test and a time point in which specimens are returned to exposure.

Climate data

Result suggested according to ISO 4582

(6) Test Date

FIG. 1 is a front view of the accelerated outdoor exposure test equipment according to a first embodiment.

The accelerated outdoor exposure test equipment of FIG. 1 may include a test chamber 101, an artificial radiation source 102, a specimen holder 103, a frame 104, and a rotational motor 105.

The accelerated outdoor exposure test equipment described in an example embodiment is test equipment designed to not only perform a test for weathering resistance for an industrial material (corresponding to a specimen), which is used outdoors, through the exposure to sunlight during the daytime, but also continuously apply stress through natural light even during the nighttime.

The test chamber 101 may be configured in the box shape and may have an artificial radiation source 102 therein to accelerate weathering resistance. The artificial radiation source 102 may be any light, such as metal halide, Xenon, UV lamp, except for sunlight. In addition, the accelerated outdoor exposure test equipment may include a specimen holder 103.

The specimen holder 103 is positioned inside the test chamber 101 at sunrise, and laterally moves to the right side from the frame 104 through external control at sunset, thereby being exposed to the outside of the test chamber 101. Then, the specimen disposed in the specimen holder 103 moved to the outside of the test chamber 101 at sunrise may be exposed to sunlight as the specimen holder 103 is moved. In other words, the specimen holder 103 is positioned at the outside of the test chamber 101 during the daytime, so the specimen is tested in the natural exposure state.

In addition, the specimen holder 103 may be positioned at the outside of the test chamber 101 and then laterally moved to the left side through external control at sunset such that the specimen holder 103 may be moved into the test chamber 101. Then, the specimen placed in the specimen holder 103 may be exposed to the artificial light irradiated by the artificial radiation source 102 positioned inside the test chamber 101 instead of sunlight as the specimen holder 103 is moved. In other words, the specimen holder 103 is positioned inside the test chamber 101 during the nighttime, the specimen is tested in the accelerated state.

The length of the frame 104 may be required to the extent of preventing a shadow made due to the test chamber 101 from arriving at the specimen holder 103 exposed to the outside. In addition, the inclination of the frame 104 may be controlled by a rotational motor 105. The position of the sun is tracked through the radiometer provided in the accelerated outdoor exposure test, and as the rotational motor 105 is operated based on the position of the sun, the inclination of the frame 104 may be changed.

Figure 2:
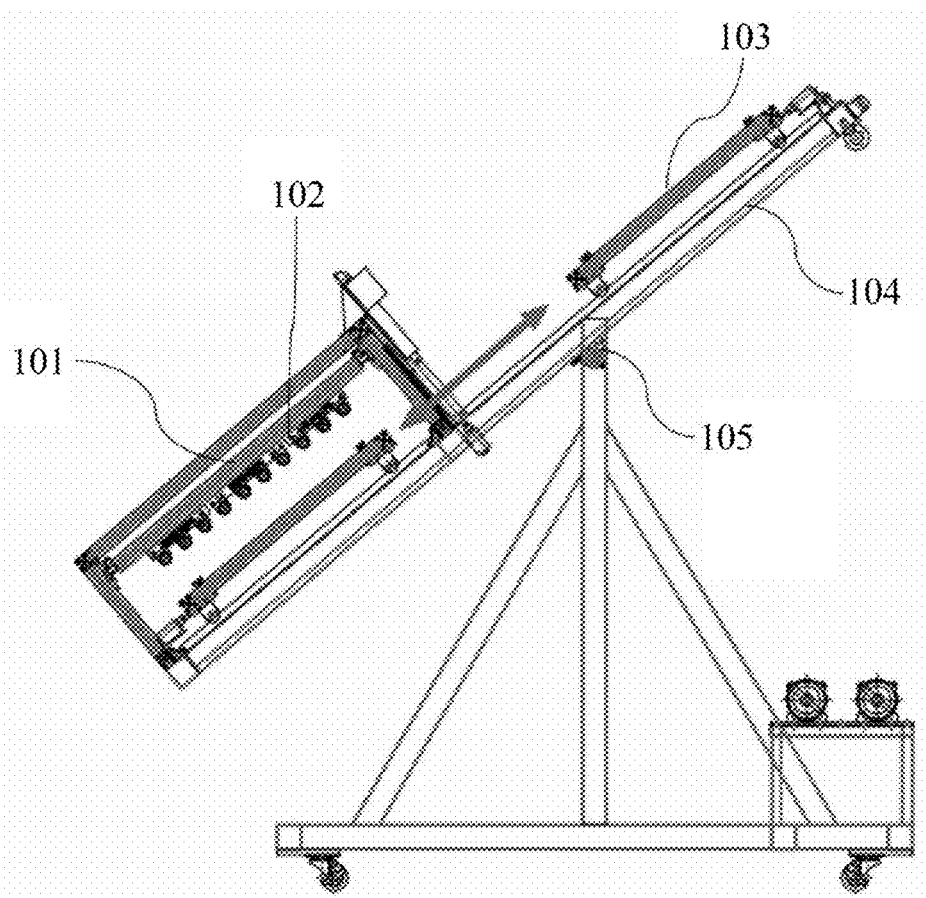
FIG. 2 is a drawing illustrating the process that the accelerated outdoor exposure test equipment is inclined based on the height of the sun according to the first embodiment.

FIG. 2 is a drawing illustrating the process that the accelerated outdoor exposure test equipment is inclined based on the height of the sun according to the first embodiment.

FIG. 2 illustrates a process that the inclination of the frame 104 in which the specimen holder 103 is positioned is changed based on the height of the sun in the accelerated outdoor exposure test equipment. Accordingly, the height of the sun is changed depending on the places in which the accelerated outdoor exposure test equipment is installed, and the inclination of the frame 104 may be changed. As the height of the sun is increased, the inclination of the frame 104 may be increased.

As illustrated in FIG. 1, the specimen for executing the accelerated outdoor exposure test equipment may be placed in the specimen holder 103. The specimen holder 103 may be positioned outside the test chamber 101 during the daytime such that the specimen is exposed to the sunlight, and may be positioned inside the test chamber 101 during the nighttime, such that the specimen may be exposed by the artificial radiation source 102 positioned inside the test chamber 101.

In FIG. 2, the inclination of the frame 104 may be controlled under the control of the rotational motor 105. As the position of the sun is tracked through a sun tracking system provided in the accelerated outdoor exposure test equipment, the rotational motor 105 may be controlled such that the inclination of the frame 104 is changed.

Figure 3:
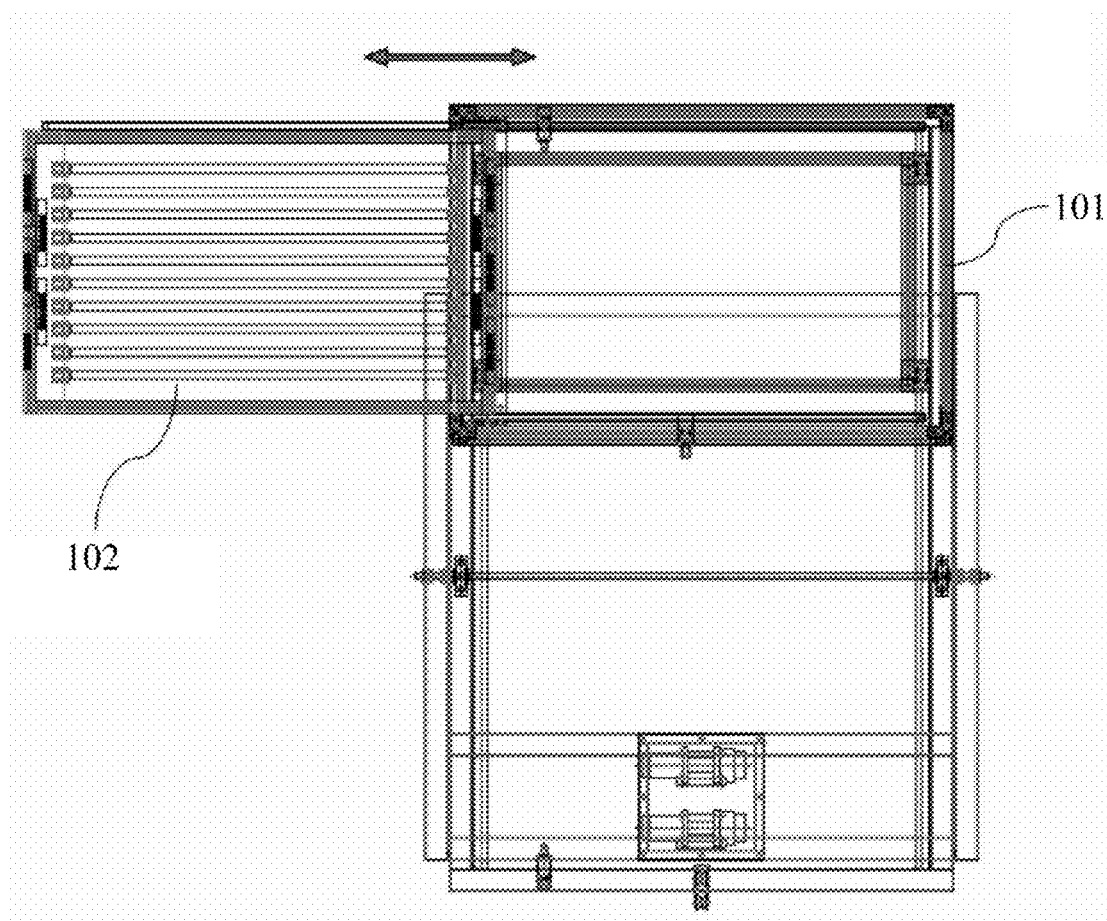
FIG. 3 is a drawing illustrating the movement of an artificial radiation source in the accelerated outdoor exposure test equipment according to the first embodiment.

FIG. 3 is a drawing illustrating the movement of an artificial radiation source in the accelerated outdoor exposure test equipment according to the first embodiment.

FIG. 3 illustrates the case that the artificial radiation source 102 moves into the test chamber 101 while sliding.

The artificial radiation source 102 may be moved out of the test chamber 101 or into the test chamber 101 according to external control. For example, the artificial radiation source 102 may be moved out of the test chamber 101 during the daytime, and may be moved into the test chamber 101 during the nighttime. Then, the specimen holder 103 illustrated in FIGS. 1 and 2 may be moved into the test chamber 101 during the nighttime, such that the specimens disposed in the specimen holder 103 may be exposed to the artificial radiation source 102 positioned inside the test chamber 101.

Figure 4:
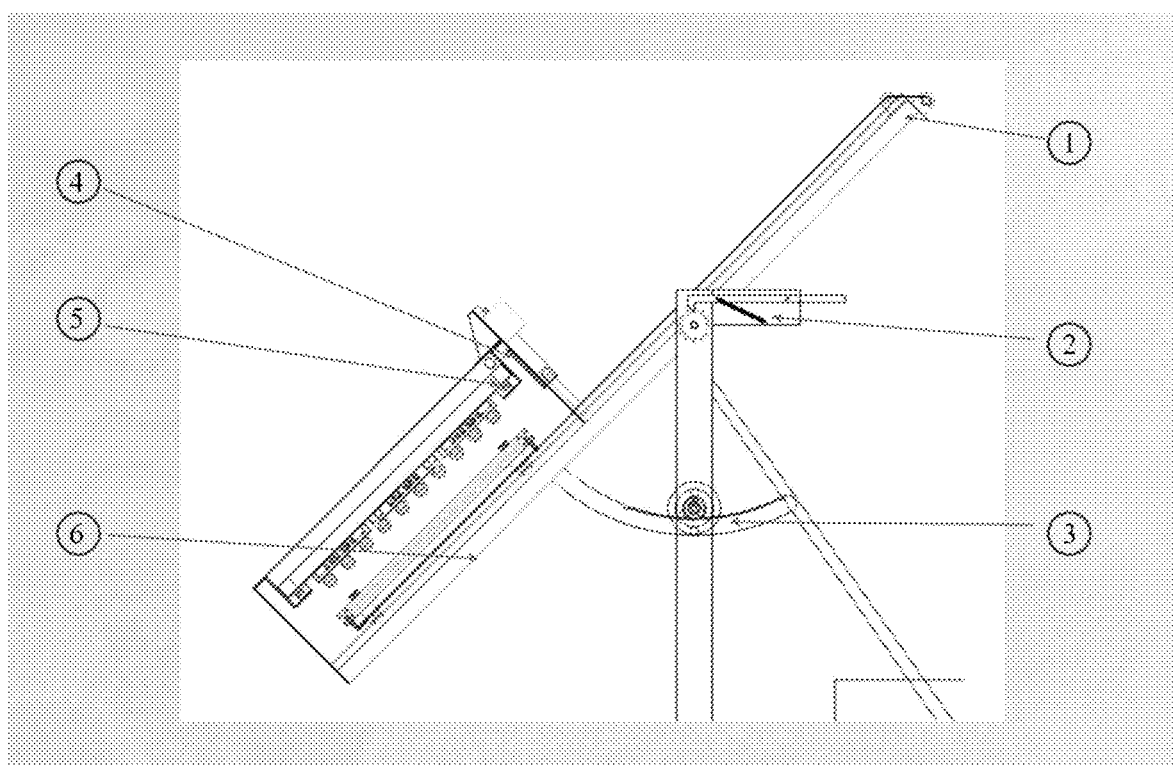
FIG. 4 is a drawing illustrating a detailed component of the accelerated outdoor exposure test equipment according to the first embodiment.

FIG. 4 is a drawing illustrating a detailed component of the accelerated outdoor exposure test equipment according to the first embodiment.

In FIG. 4, reference numeral 0 corresponds to the frame of FIGS. 1 and 2, reference numeral 0 may refer to a gear device, reference numeral 0 may refer to a rotational component to change the angle of the frame, reference numeral 0 may refer to a screen, and reference numeral 0 may refer to a sliding device for radiation source. The details of the components will be described below with reference to FIGS. 5 to 8.

Figure 5:
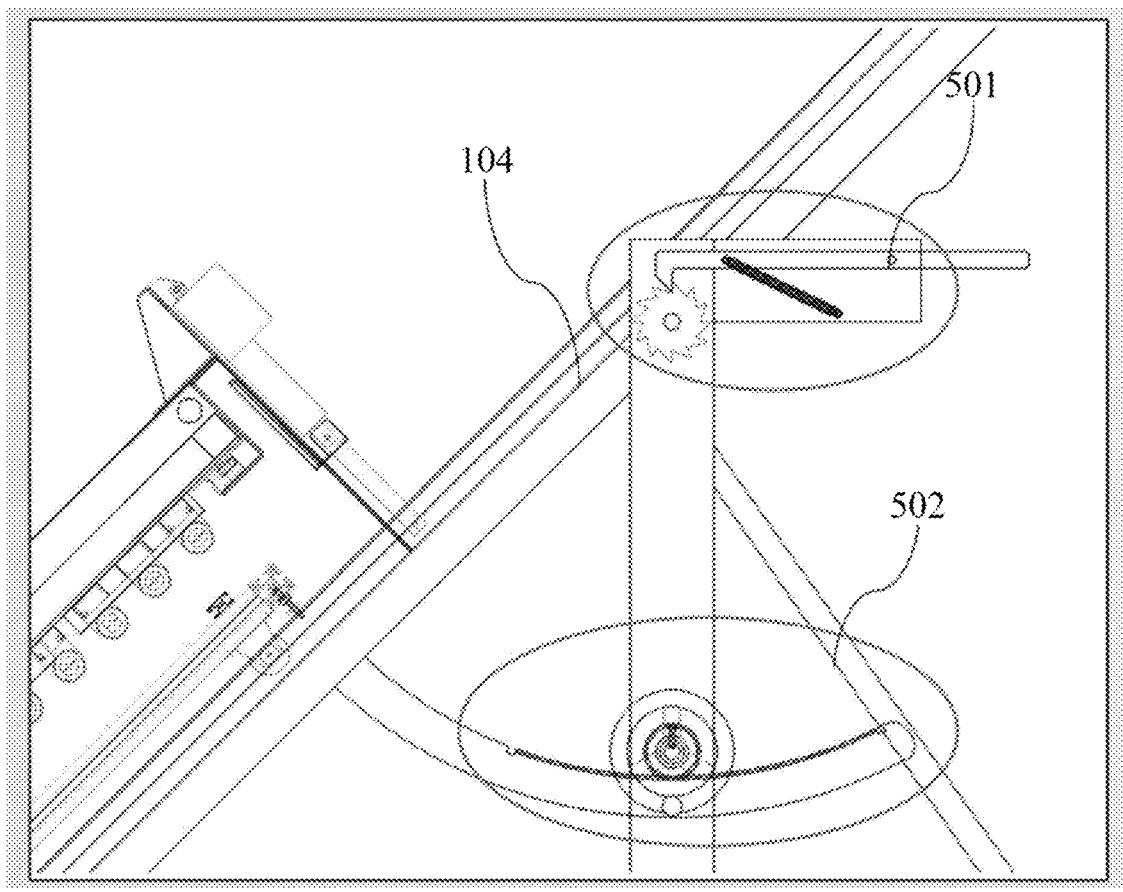
FIG. 5 is a drawing illustrating a rotational manner in the accelerated outdoor exposure test equipment according to the first embodiment.

FIG. 5 is a drawing illustrating a rotational manner in the accelerated outdoor exposure test equipment according to the first embodiment.

The frame 104 in the accelerated outdoor exposure test equipment may be rotated depending on the height of the sun. In this case, the rotation degree is determined by a coupling device 501 and a rotational device 502 which are in in a gear type. The coupling device 501 may be coupled to the gear device to prevent the coupling device 501 from being additionally rotated due to the external force after the frame 104 of the accelerated outdoor exposure test equipment is rotated. The gear device may include a toothed rotating component and a latch that may be fixed to each blade of the tooth. In addition, the frame may be rotated depending on the rotational angle corresponding to the extent that may be mapped to the height of the sun by the rotational device 502 in the gear type.

Figure 6:
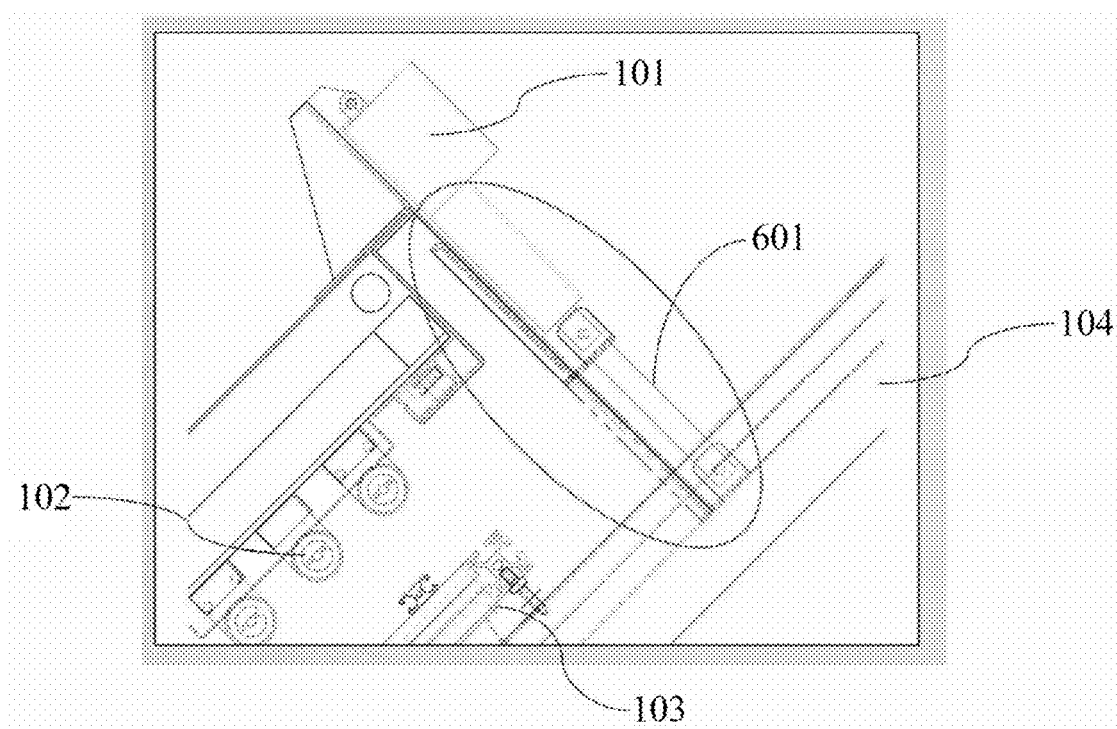
FIG. 6 is a drawing illustrating a component for preventing the infiltration of rainwater during rain in the accelerated outdoor exposure test equipment, according to the first embodiment.

FIG. 6 is a drawing illustrating a component for preventing the infiltration of rainwater during rain in the accelerated outdoor exposure test equipment, according to the first embodiment.

In FIG. 6, after the specimen holder 103 having the specimen to be tested is moved into the test chamber 101, it is necessary for the specimen holder 103 not to receive the external environmental factor. In FIG. 6, the external environmental factors may be blocked through a screen 601 disposed at the entrance of the test chamber 101. For example, the screen 601 may be disposed to prevent rainwater from being infiltrated into the test chamber 101 when it rains.

Since the external environment factor may exert an influence on the degradation state, it is necessary to block the external environmental factor, when a test is performed in the accelerated state through the artificial radiation source 102.

Figure 7:
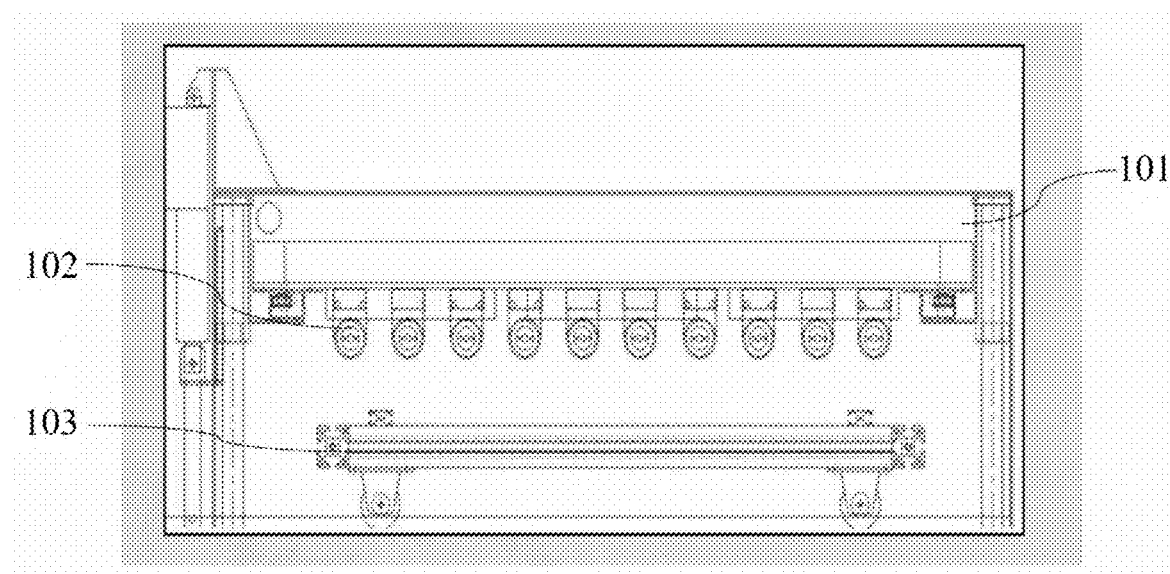
FIG. 7 is a drawing illustrating a sliding action of the artificial radiation source in the accelerated outdoor exposure test equipment, according to the first embodiment.

FIG. 7 is a drawing illustrating a sliding action of the artificial radiation source in the accelerated outdoor exposure test equipment according to the first embodiment.

Referring to FIG. 7, the artificial radiation source 102 may be moved into or out of the test chamber 101 while sliding. FIG. 7 illustrates a situation in which the artificial radiation source 102 is disposed inside the test chamber 101, and a specimen holder 103 having a specimen placed therein is moved into the test chamber 101 during the nighttime. According to an example embodiment, the artificial radiation source 102 may be fixed into the test chamber 101, or is movable into or out of the test chamber 101 according to external control.

Figure 8:
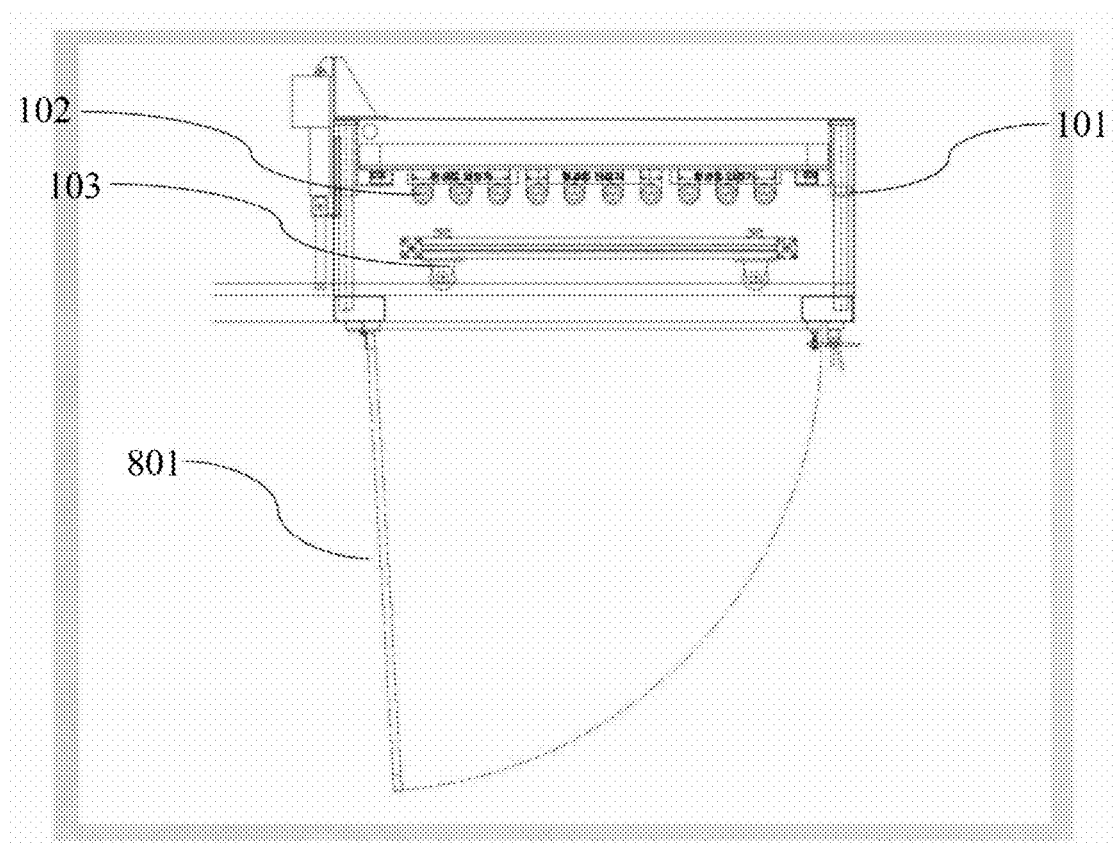
FIG. 8 is a drawing illustrating a screen in the accelerated outdoor exposure test equipment, according to the first embodiment.

FIG. 8 is a drawing illustrating a screen in the accelerated outdoor exposure test equipment, according to the first embodiment.

In FIG. 8, the test chamber 101 may be configured in an open shape. When the artificial radiation source 102 positioned inside the test chamber 101 irradiates artificial light during the nighttime, bugs may be gathered from the outside of the test chamber 101 by the artificial light. According to the example embodiment, a screen 801 may be further provided to prevent bugs, which are gathered around the artificial light, from being introduced the test chamber 101. In this case, the screen 801 may be configured in the form of a net to prevent the bugs from being introduced into the test chamber 101.

In this case, when the front surface of the test chamber 101 is open, the irradiance level of the artificial radiation source 102 may be changed due to various bugs gathered during the nighttime.

Accordingly, the screen 801 may be disposed on the entire surfaces or at least one surface of the test chamber 101. When the artificial radiation source 102 is turned on during the nighttime, it is possible to prevent bugs gathered around the artificial radiation source 102. However, the screen may be provided, in an open form instead of a fixed form, on some surfaces of a test chamber (lamp box) 1701 to maintain and repair the artificial radiation source 1702. For example, the screen 801 is open from the test chamber 101 during the daytime, and may close the test chamber 101 when the specimen holder 103 is moved into the test chamber 101 during the nighttime.

Figure 9:
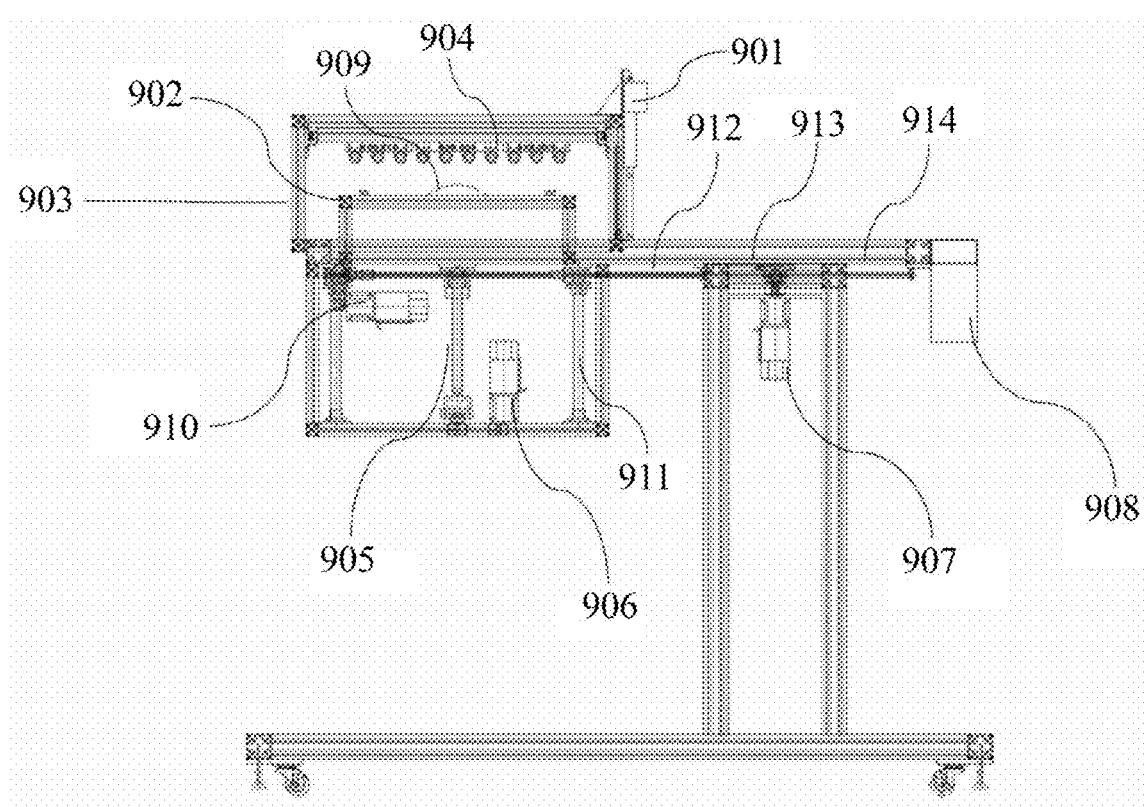
FIG. 9 is a drawing illustrating a screen in accelerated outdoor exposure test equipment, according to a second embodiment.

FIG. 9 is a drawing illustrating a screen in accelerated outdoor exposure test equipment, according to a second embodiment.

Referring to FIG. 9, accelerated outdoor exposure test equipment may include an electric cylinder 901, a specimen holder 902, a test chamber 903, an artificial radiation source 904, a ball screw set (transfer up and down) 905, a reverse motor (transfer up and down) 906, a stepping motor (to control angle) 907, a balance weight 908, a solar system 909, a reverse motor (transfer up and down) 910, a guide spline (transfer up and down) 911, a ball screw set (transfer up and down) 912, a bevel gear set (to control an angle) 913, and a guide spline (transfer up and down) 914. Accelerated outdoor exposure test equipment illustrates in FIGS. 10 to 13 is the same as the accelerated outdoor exposure test equipment of FIG. 9.

As illustrated in FIG. 9, the test chamber 903 may move up and down. When the test chamber 903 moves up, the specimen holder 902 may be moved into the test chamber 903. In other words, the test chamber 903 moves upward during the nighttime to have a space therein. The specimen holder 902 is moved into the space formed in the test chamber 903 and irradiated with artificial light of the artificial radiation source 904.

The test chamber 903 may move upward at sunset. The test holder 902 may be moved into the test chamber 903 through the space formed when the test chamber 903 move upward. Then, the specimen placed in the specimen holder 902 may be exposed to the artificial light irradiated from the artificial radiation source 904.

In the case of the sunrise time, the specimen holder 902 is transferred out of the test chamber 903, and the test chamber 903 moves downward. The specimen placed in the specimen holder 902 is exposed to sunlight, instead of the artificial light from the artificial radiation source 904 during the daytime.

The test chamber 903 moves up and down as the guide spline 911 is transferred up and down, and the specimen holder 902 moves left and right as the guide spline 914 is transferred left and right.

Figure 10:
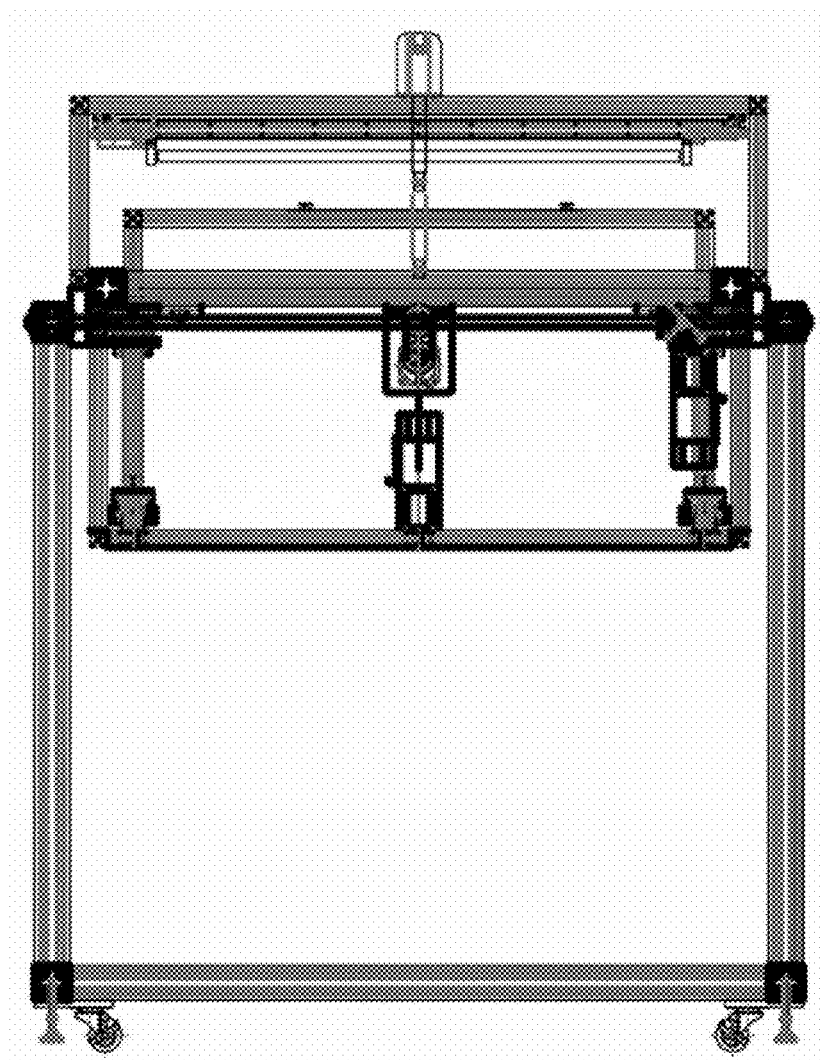
FIG. 10 is a side view of the accelerated outdoor exposure test equipment according to the second embodiment.

FIG. 10 is a side view of the accelerated outdoor exposure test equipment according to the second embodiment.

FIG. 10 illustrates a side view to identify the up and down movement of the test chamber for the accelerated outdoor exposure test equipment of FIG. 9.

Figure 11:
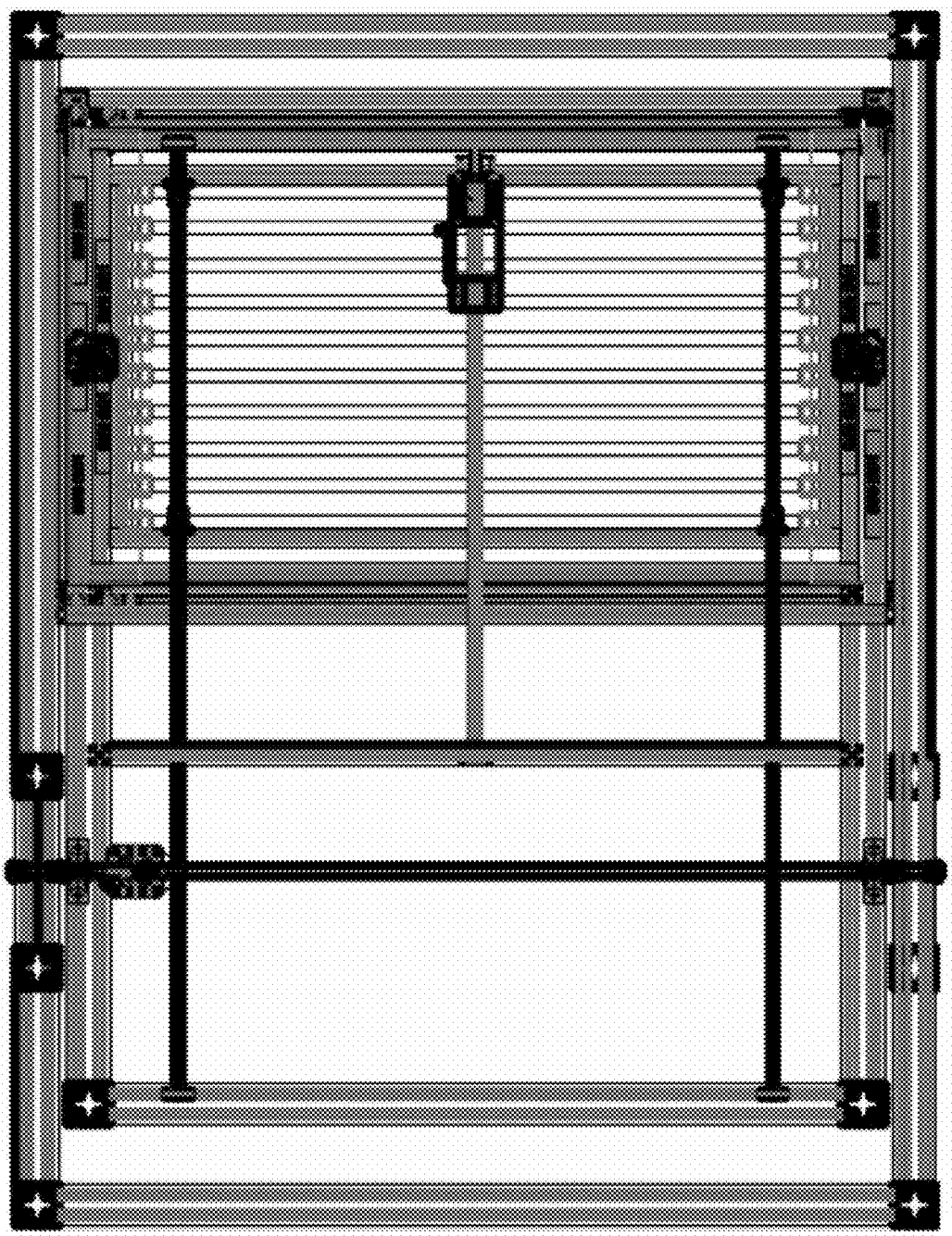
FIG. 11 is a drawing illustrating the action of an artificial radiation source in the accelerated outdoor exposure test equipment according to the second embodiment.

FIG. 11 is a drawing illustrating the action of an artificial radiation source in the accelerated outdoor exposure test equipment according to the second embodiment.

FIG. 11 is a view when viewed from the top of the accelerated outdoor exposure test equipment, in which as the test chamber moves up and down, the inner space of the test chamber may be formed, and the specimen holder having the specimen placed in the space may be moved.

Figure 12:
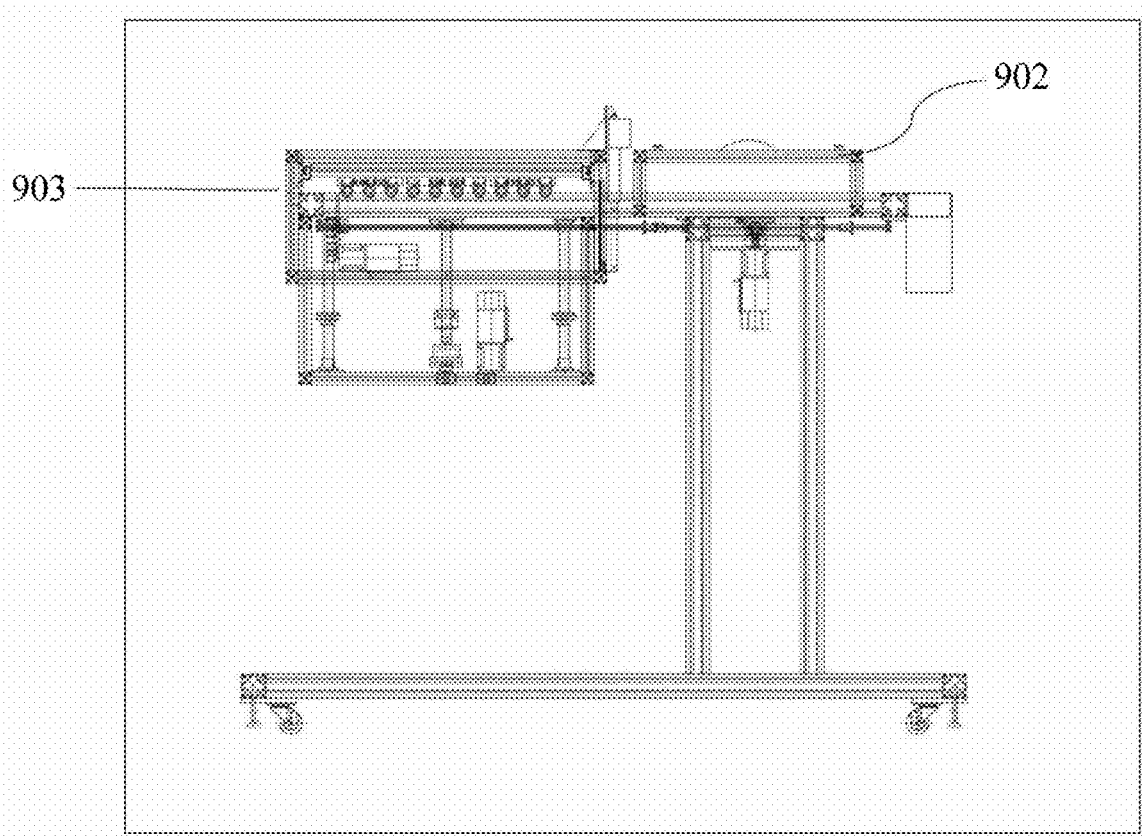
FIG. 12 is a drawing illustrating the operation of the accelerated outdoor exposure test equipment at sunset according the second embodiment.

FIG. 12 is a drawing illustrating the operation of the accelerated outdoor exposure test equipment at sunset according the second embodiment.

FIG. 12 illustrates the test chamber 903 moved down when time is changed from the sunrise time to the sunset time. The specimen holder 902 having the specimen is moved out of the test chamber 903, before the test chamber 903 is moved downward from the position of the test chamber 903 illustrated in FIG. 9. Thereafter, as the test chamber 903 is moved downward, the test chamber 903 is moved to the position illustrated in FIG. 12.

Figure 13:
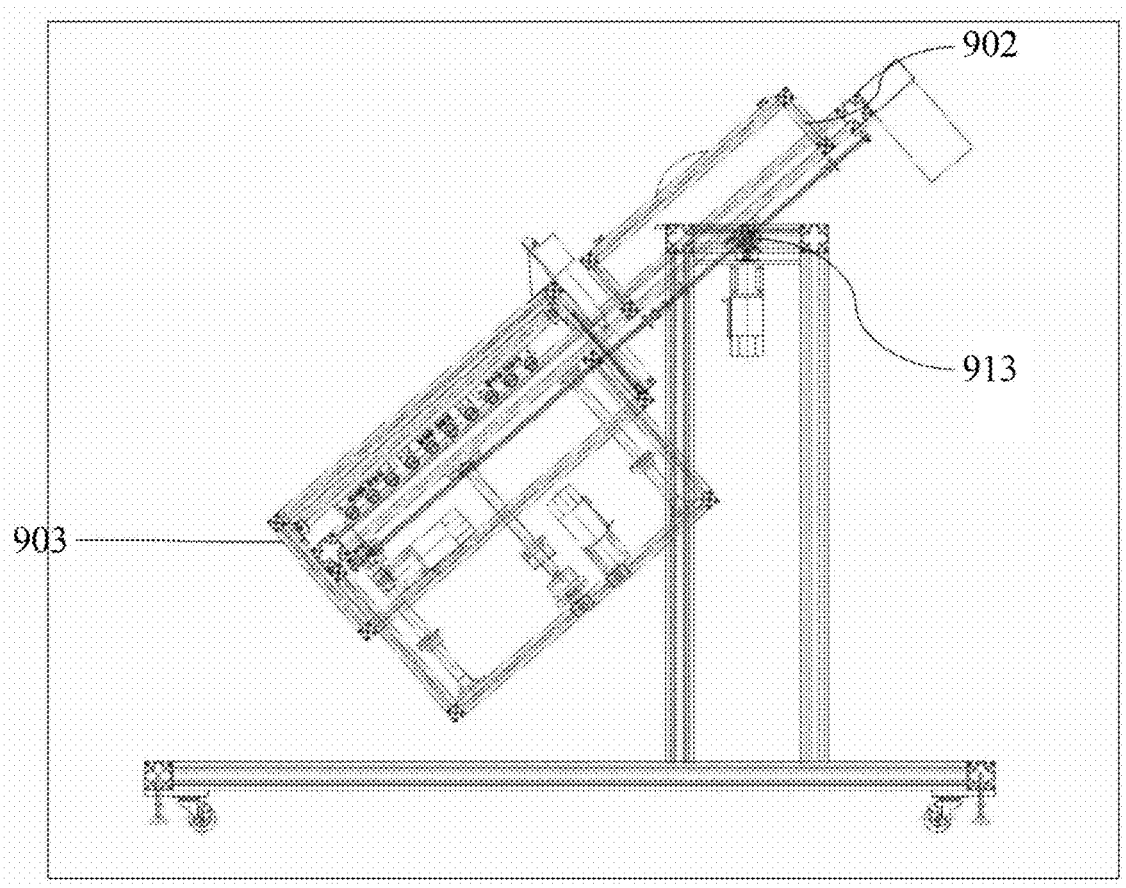
FIG. 13 is a drawing illustrating the operation of changing an angle based on a solar radiation quantity in the accelerated outdoor exposure test equipment according to the second embodiment.

FIG. 13 is a drawing illustrating the operation of changing an angle based on a solar radiation quantity in the accelerated outdoor exposure test equipment according to the second embodiment.

FIG. 13 illustrates the situation in which the test holder 902 is transferred out of the test chamber 903, as time is changed from the sunrise time to the sunset time. In this case, the angle of the frame supporting the specimen holder 902 may be changed according to the operation of the bevel gear set 913. The angle of the frame may be changed based on the solar radiation quantity of sunlight for outdoor exposure. The accelerated outdoor exposure test equipment may control the angle of the frame considering the height of the sun which varies with latitudes or locations.

Figure 14:
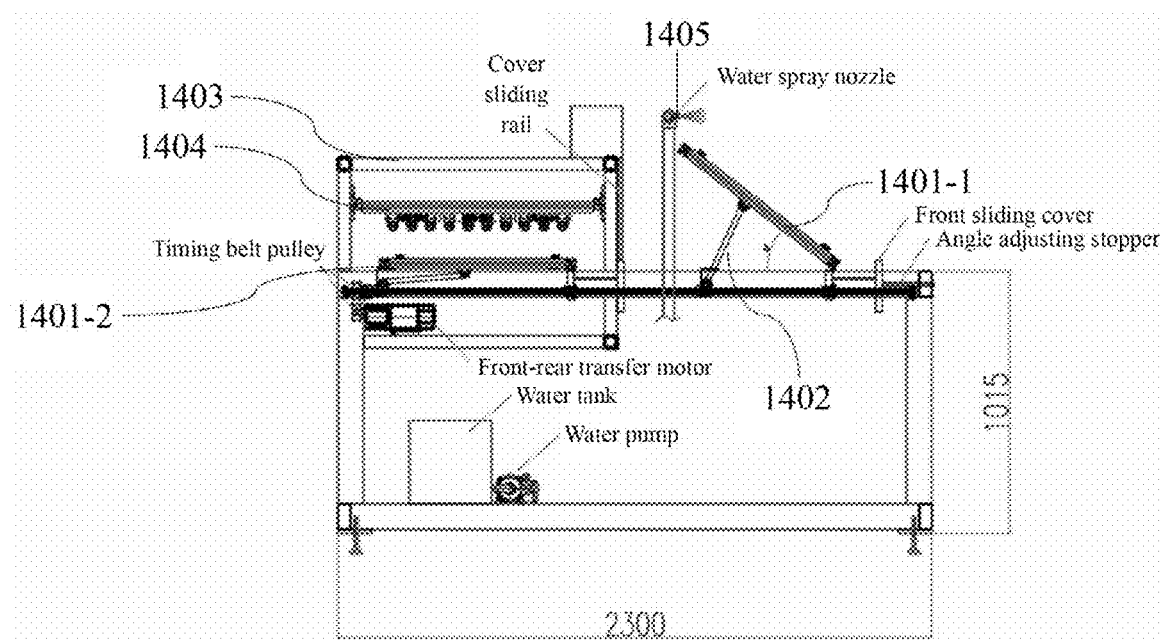
FIG. 14 is a front view illustrating accelerated outdoor exposure test equipment according to a third embodiment.

FIG. 14 is a front view illustrating accelerated outdoor exposure test equipment according to a third embodiment.

In the accelerated outdoor exposure test equipment illustrated in FIG. 14, a specimen holder 1401-1 or 1401-2 having the specimen placed therein is placed at a position of the specimen holder 1401-1 during the daytime and then is moved to a position of the specimen holder 1401-2 during the nighttime. In other words, the specimen holders illustrated in FIG. 14 represent the specimen holder 1401-1 positioned during the daytime and the specimen holder 1401-2 positioned during the nighttime.

During the daytime, the specimen holder 1401-1 may be positioned outside the test chamber 1403 so that the specimens placed in the specimen holder 1401-1 are exposed to sunlight, which is natural light. To this end, at sunrise, the specimen holder 1401-1 laterally moves out of the test chamber 1403, and then the angle is changed through the cylinder 1402 according to the height of the sun. In addition, the accelerated outdoor exposure test equipment may include a water spray nozzle 1405 to spray water toward the specimen placed in the specimen holder 1401 after water is moved from a water tank through a water pump. As the water is sprayed through the water spray nozzle, the test environment may exactly reflect a real environment having moisture, frog, or cloud.

In addition, when the accelerated outdoor exposure test equipment is changed from the sunset time to the sunrise time, the specimen holder 1401-1 moves laterally from the inner part of the test chamber 1403 to a front sliding cover while sliding. After that, the angle of the specimen holder 1401-1 is controlled through the cylinder 1402 based on the height of the sun. In addition, the specimen holder 1401-1 may be fixed by an angle controlling stopper to prevent the angle of the specimen holder 1401-1 from being additionally controlled.

In addition, a cover sliding rail disposed in the test chamber 1403 allows the specimen holder 1401-2 to move up and down. The specimen holder 1401-2 is moved left and right through a transfer motor, and the degree of movement of the specimen holder 1401-2 is determined through the timing belt pulley. The specimen holder 141-1 moves out of the test chamber 1403 during the daytime after the sunrise time, and moves into the test chamber during the nighttime after the sunset time, such that the specimen placed in the specimen holder 1401 is exposed to the artificial light irradiated from an artificial radiation source 1404.

Figure 15:
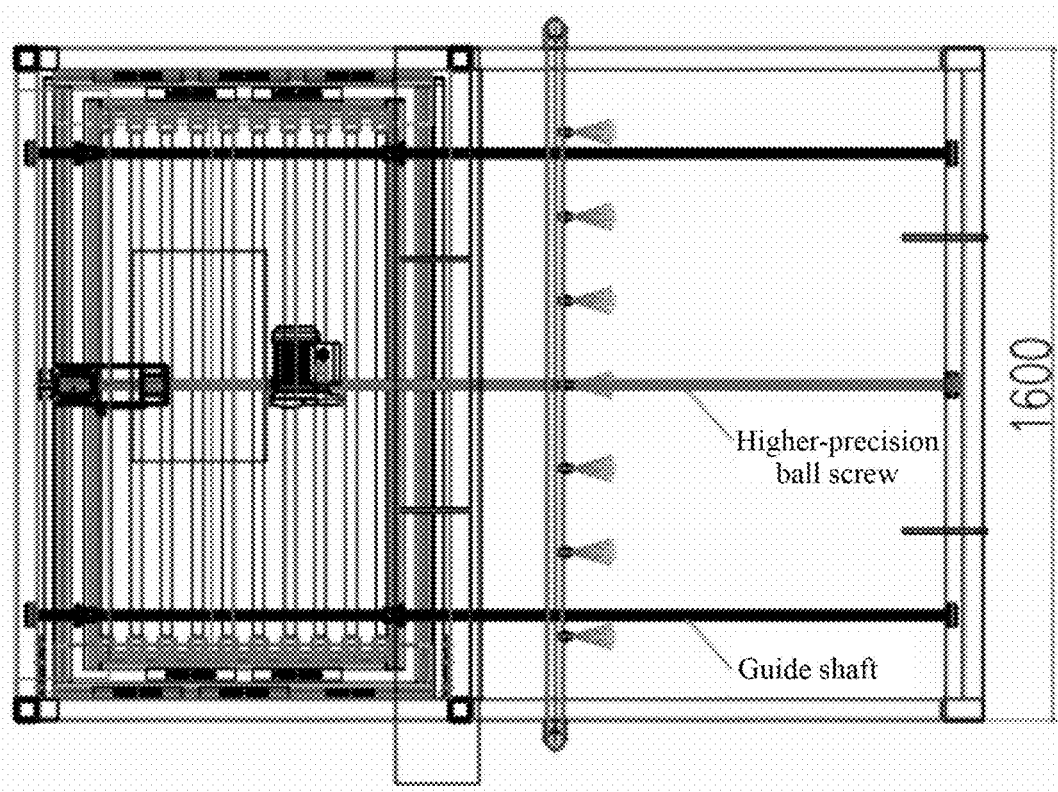
FIG. 15 is a drawing illustrating the detailed view of the artificial radiation source part in the accelerated outdoor exposure test equipment, according to the third embodiment.

FIG. 15 is a drawing illustrating the detailed view of the artificial radiation source in the accelerated outdoor exposure test equipment, according to the third embodiment.

FIG. 15 is a top view of the accelerated outdoor exposure test equipment illustrated in FIG. 14. The higher-precision ball screw is used for the transfer of the specimen holder, and a guide shaft serves as a guide to establish a path in which the specimen holder moves.

Figure 16:
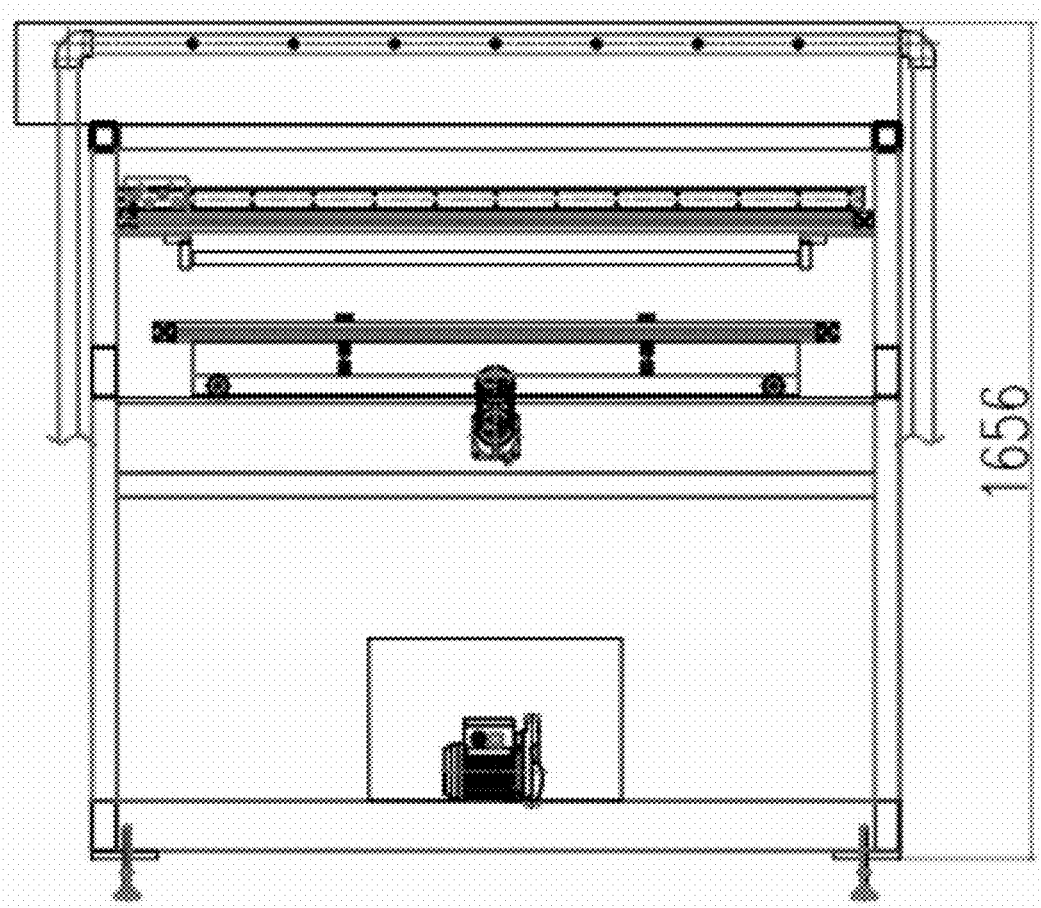
FIG. 16 is a side view illustrating the accelerated outdoor exposure test equipment according to the third embodiment.

FIG. 16 is a side view illustrating the accelerated outdoor exposure test equipment according to the third embodiment.

FIG. 16 illustrates a case where a specimen holder having a specimen placed therein is positioned inside the test chamber in the accelerated outdoor exposure test equipment illustrated in FIG. 14. As a specimen holder is placed inside the test chamber, the specimen placed in the specimen holder may be exposed to the artificial light irradiated from the artificial radiation source disposed inside the test chamber.

Figure 17:
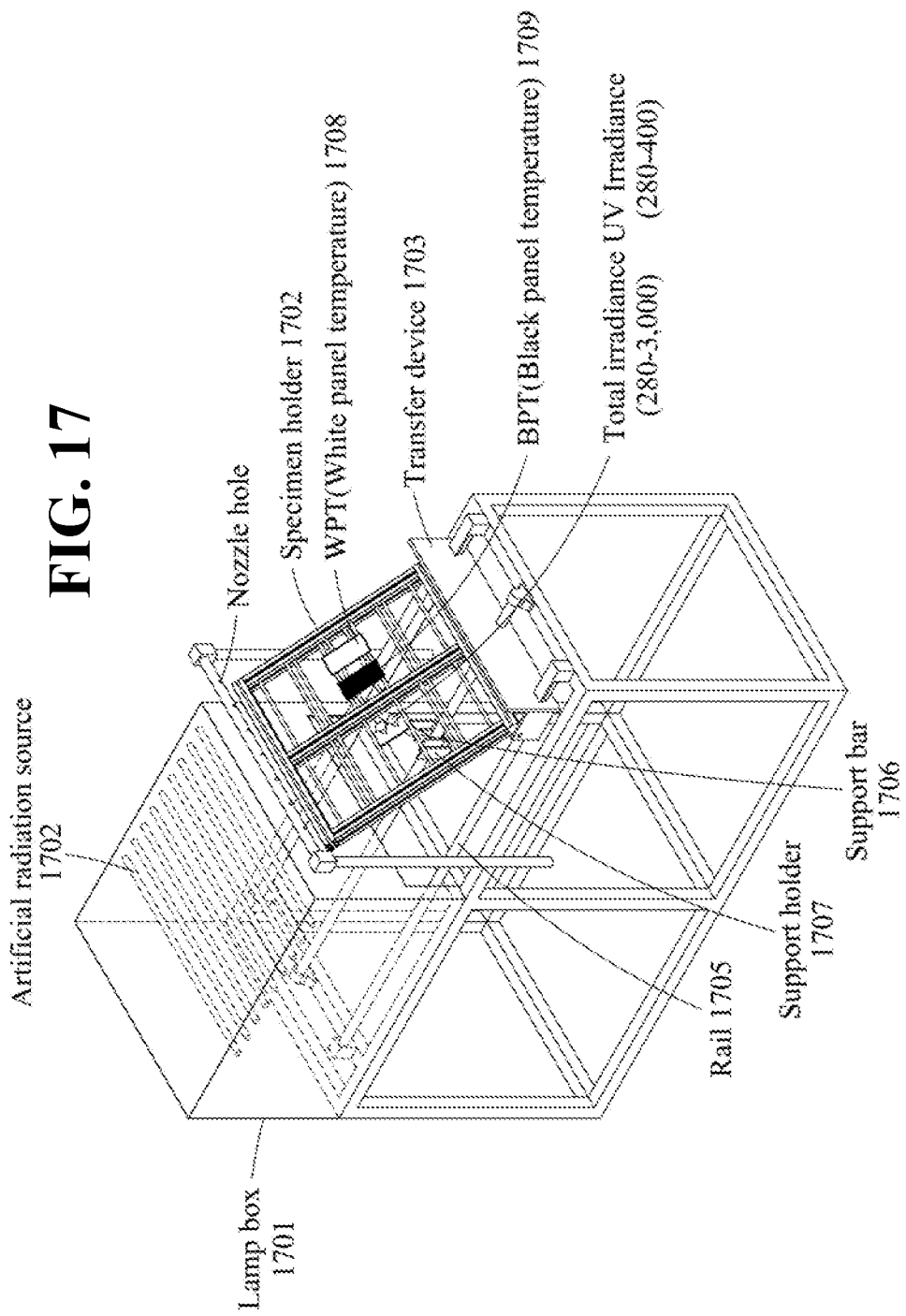
FIG. 17 is a side view illustrating accelerated outdoor exposure test equipment according to a fourth embodiment.

FIG. 17 is a side view illustrating accelerated outdoor exposure test equipment according to a fourth embodiment. The accelerated outdoor exposure test equipment illustrated in FIGS. 18A, 18B, 19A, and 19B is the same as the accelerated outdoor exposure test equipment in FIG. 17.

The accelerated outdoor exposure test equipment described in the example embodiment is a test equipment designed to not only perform weathering resistance for an industrial material (corresponding to a specimen) through the exposure to sunlight during the daytime, but also continuously apply stress even during the nighttime through natural light.

The artificial radiation source 102 may be disposed in test chamber 101. The artificial radiation source 102 may be any light except for sunlight such as metal halide, Xenon, UV lamp, and the like. In addition, the accelerated outdoor exposure test equipment may include a specimen holder 1702 having a specimen provided therein. The specimen holder 1702 is placed inside the test chamber 101 during the nighttime. At sunrise, the specimen holder 1702 moves to the right along a rail through external control. Accordingly, the specimen holder 1702 having the specimen may be exposed to the outside of the test chamber 1701. The specimen disposed in the test chamber may be exposed to sunlight as the specimen holder 1702 is moved. In other words, as the specimen holder 1702 is positioned at the outside of the test chamber 1701, the specimen is tested in the natural exposure state.

In addition, the specimen holder 1702 is placed outside the test chamber 101 during the daytime. When the sunset time arrives, the specimen holder 1702 may move to the left through external control to move into the test chamber 101. Then, the same placed in the specimen holder 1702 may be exposed to the artificial light irradiated from the artificial radiation source 102 positioned inside the test chamber 101 instead of the sunlight, as the specimen placed in the specimen holder 1702 is moved into the test chamber 1701. In other words, as the specimen holder 1702 is placed inside the test chamber 1701, the specimen is tested in the accelerated state.

The specimen holder 1702 having the specimen placed therein may be moved along the rail 1705 while moving into the test chamber 1701 or out of the test chamber 1701. In addition, as the specimen holder 1702 is coupled to a support holder 1707 and a support bar 1706, the inclination of the specimen holder 1702 may be varied depending on an extent pushed up by the support holder 1701.

Meanwhile, the accelerated outdoor exposure test equipment may include a black panel temperature (BPT) 1709 and a white panel temperature (WPT) 1708 to measure the temperature of the specimen holder 1702. In addition, the accelerated outdoor exposure test equipment may include a water spray system 1704 to spray water to a specimen placed in the specimen holder 1702 through a nozzle hole thereof. In other words, water may be sprayed to the specimen periodically or aperiodically to provide an experimental environment similar to the real environment where humidity is present.

The inclination of the specimen holder 1702 having the specimen may be changed, based on the height of the sun in the accelerated outdoor exposure test equipment. To this end, the accelerated outdoor exposure test equipment may include a total solar system or an ultraviolet solar system provided in a specific area. The inclination of the specimen holder 1702 can be changed depending on the height of the sun, which is measured through a solar system. In this case, the height of the sun is changed according to the location in which the accelerated outdoor exposure test equipment is installed, and the inclination of the specimen holder 1702 may be changed depending on the height of the sun. As the height of the sun is increased, even the inclination of the specimen holder 1702 may be increased.

After the specimen holder 1702 having the specimen is moved into the test chamber 1701, the specimen holder 1702 having the specimen may need to be prevented from being influenced by an external environment factor. In detail, the external environment factor may be blocked through a screen disposed at the entrance of the test chamber 1701. For example, the screen may be disposed to prevent rainwater from being infiltrated into the test chamber 1701 when it rains. Since the external environment factor may exert an influence on the degradation state, it is necessary to block the external environmental factor, when a test is performed in the accelerated state through the artificial radiation source 102.

The screen may be placed on at least one of a plurality of surfaces constituting a lamp test chamber 1701. The mode of the screen may be changed to an open mode and a closed mode depending on the sunrise time and the sunset time. At sunset time, the specimen holder 1702 having the specimen is moved into the test chamber 1701, and the specimen is exposed to artificial light through the artificial radiation source 1702 disposed inside the test chamber 101. In this case, when the front surface of the test chamber 1701 is open, the light intensity of the artificial radiation source 1702 may be changed due to various bugs gathered during the nighttime.

Thus, although the test chamber 1701 is open, when the artificial radiation source 1702 is turned on through an insect-proof type the screen at night, it is possible to prevent bugs from being gathered around the artificial radiation source 1702. However, the screen may be provided, in an open form instead of a fixed form, on some surfaces of the test chamber 1701 to maintain and repair the artificial radiation source 1702.

Figure 18B:
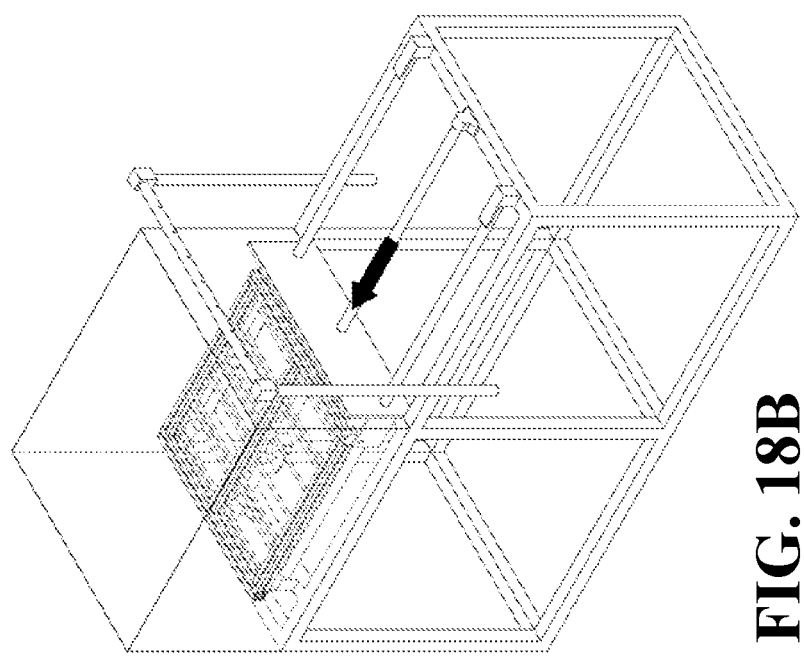
FIGS. 18A and 18B illustrate the operation of the accelerated outdoor exposure test equipment at sunset according to the fourth embodiment.
Figure 18A:
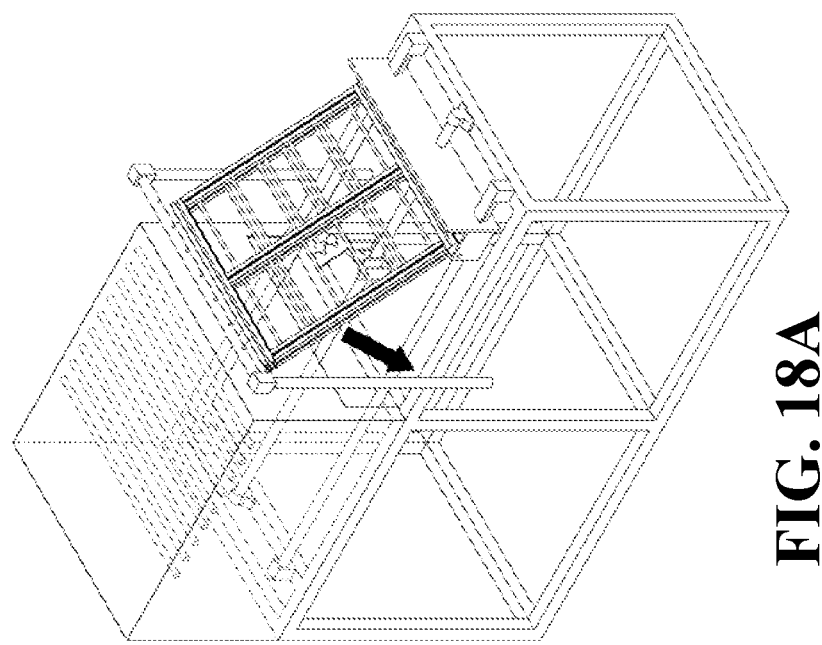

FIGS. 18A and 18B illustrate the operation of the accelerated outdoor exposure test equipment at sunset according to the fourth embodiment. In particular, FIGS. 18A and 18B illustrate the operation of the accelerated outdoor exposure test equipment at sunset. This operation is automatically performed through external control.

The inclination of the test chamber having the specimen may be changed through a support bar 1706 and a support holder 1707. In addition, the specimen holder 1702 having the specimen may be moved left and right.

At sunset, the specimen holder 1707 is moved into the direction of a lamp test chamber 101, the specimen holder 1702 having the specimen is rearranged to a plan form from a form titled at a specific angle during the outdoor exposure test. In other words, the specimen holder 1702 maintains the N-degree angle and is changed to the 0 degree angle through the support holder 1707.

Then, as the specimen holder 1702 is moved in the direction of the test chamber 1701, the specimen holder 1702 having the specimen is moved into the test chamber 1701. Then, as illustrated in FIG. 18B, the specimen holder 1702 may move into the lamp test chamber 1701, and the specimen placed in the specimen holder 1702 may be exposed to the artificial radiation source 102.

Figure 19B:
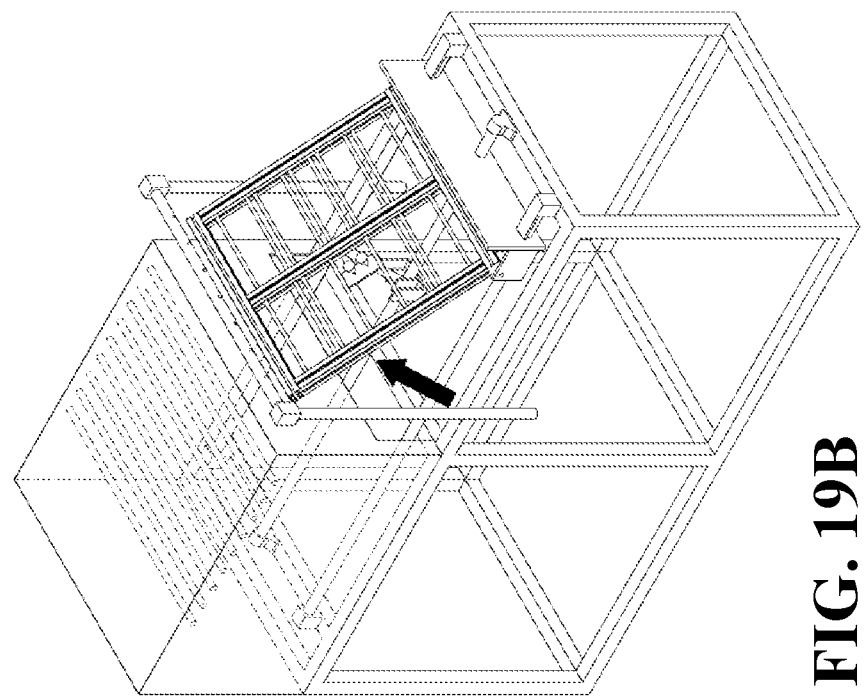
FIGS. 19A and 19B illustrate the operation of the accelerated outdoor exposure test equipment at sunset according to the fourth embodiment.
Figure 19A:
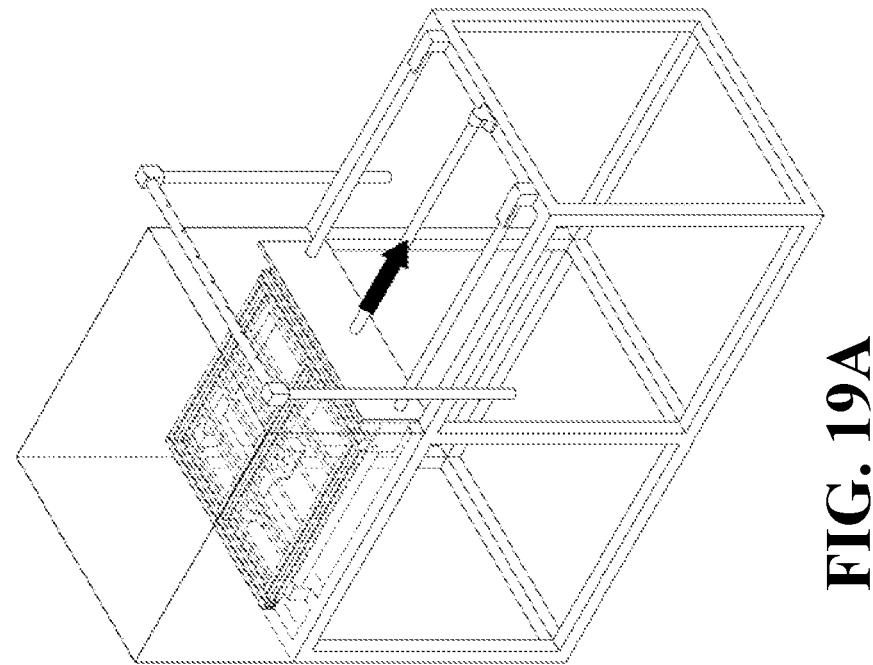

FIGS. 19A and 19B illustrate the operation of the accelerated outdoor exposure test equipment at sunset according to the fourth embodiment.

FIG. 19A illustrates a procedure in which the specimen holder 1702 is moved out of the test chamber 1701 when time is changed from sunset time to sunrise time. In this case, as the support holder 1705 is moved out of the test chamber 1701, the test holder 1702 is moved out of the test chamber 1701 together with the support holder 1705.

After the specimen holder 1702 is moved out of the test chamber 101, the support holder 1707 is moved as illustrated in FIG. 19B while the support bar 1706 coupled to the support holder 1707 is pushing up the specimen holder 1702. The specimen holder 1702 is not moved any more after moving out of the test chamber 101. The inclination of the specimen holder 1702 may be varied as the support holder 1707 is moved.

The movement of the support holder 1707 is varied depending on the height of the sun, which is measured by the solar system placed in the test chamber 101. In other words, as the height of the sun is increased, the inclination of the specimen holder 1702 may need to be increased to be appropriate to the height of the sun. Then, as the support holder 1707 is moved to the right, the inclination of the specimen holder 1702 is increased. To the contrast, as the height of the sun is decreased, the inclination of the specimen holder 1702 may need to be decreased to be appropriate to the height of the sun. Then the support holder 107 is moved in the left direction while the movement of the support holder 107 is being controlled depending on the height of the sun.

In the case of sunrise time, the specimen holder 1702 is moved out of the test chamber 1701, and the angle of the specimen holder 1702 is varied depending on the height of the sun. In addition, the accelerated outdoor exposure test equipment may provide, to the specimen placed in the test chamber, water from the water tank through a nozzle hole in the water spray system 1704 to spray the water on the specimen. The water sprayed through the water spray system 1704 may make the test environment as a more actual environment.

Further, in the accelerated outdoor exposure test equipment, the specimen holder 1702 may slide with the front sliding cover, so the angle is controlled by taking into consideration the height of the sun, and may be fixed by the angle controlling stopper to prevent the angle from being additionally controlled.

Accordingly, the specimen holder 1702 is moved out of the test chamber 101 at sunrise such that the specimen is exposed to sunlight, and moved into the test chamber 101 at sunset such that the specimen placed in the specimen holder 1702 is exposed by the artificial radiation source 1702 disposed inside the test chamber 1701.

Meanwhile, the method according to an example embodiment may be implemented as a program that is executable in a computer, and may be implemented in various recording media such as a magnetic storage medium, an optical read medium, and a digital storage medium.

Various technologies described herein may be implemented in digital electronic circuitry, or in computer hardware, firmware, software, or in combinations of them. The embodiments can be implemented with a computer program embodied in a computer program product, that is, an information carrier, for example, a machine-readable storage medium (computer-readable medium) or a radio signal, in order to process the operations of a data processing device, such as a programmable processor, a computer, or multiple processors, or to control the operations. Computer programs, such as the computer program (s) described above, may be written in any form of programming languages including compiled or interpreted languages, and may be provided in the form of an independent program, module, component, or sub-routine, or as another unit appropriate to use in a computing environment. The computer program may be provided to be processed on one computer or multiple computers at one side or distributed throughout multiple sites and connected with each other over a communication network.

Processors appropriate to process a computer program include, for example, both general purpose and special purpose microprocessors, and any one or more of processes of any type of digital computer. In general, the processor will receive instructions and data from a read only memory (ROM), a random access memory (RAM), or both of the ROM and the RAM. Elements of a computer may include at least one processor that executes instructions and one or more memory devices that store instructions and data. In general, information carriers appropriate to embody computer program instructions and data may include, for example, semiconductor memory devices such as magnetic media (e.g., a hard disk, a floppy disk, or a magnetic tape), optical media (e.g., CD-ROM and DVD), magneto-optical media (e.g., a floptical disk), read only memories (ROMs), random access memories (RAMs), flash memories, erasable programmable ROMs, or electrically erasable programmable ROMs. The processor and the memory is compensated by or included in a special purpose logic circuitry. Examples of computer instructions include not only machine language codes created by a compiler, but also high-level language codes that are capable of being executed by a computer by using an interpreter or the like.

In addition, the computer readable medium may be any available medium that can be accessed by a computer, and may include both computer storage media and transmission media.

While this specification includes the details of numerous specific embodiments, these should not be construed as limited to any invention or scope of the claims, but rather to features that may be specific to any embodiment of any invention. It should be understood as an explanation for features specific to a specific embodiment of a specific invention. Specific features disclosed in the disclosure based on the content of an individual embodiment may be implemented in the combination forms of the features in a single embodiment. To the contrast, various features described in the context in a singular embodiment can be implemented in plural embodiments individually or through sub-combinations of the features. Furthermore, although features act in the specific combination and claimed at the first stage, one or more features in the claimed combination may be excluded from the claimed combination in some case, and the claimed combination may be changed to a sub-combination or the modification of the sub-combination.

Similarly, although operations are depicted in specific order, this is merely shown to obtain an exemplary result. In other words, it should not be interpreted that the operations should be performed in specific order or sequentially, or all operations should be operated. In a specific case, multi-tasking and parallel processing are advantageous. In addition, separation of the various device components of the above-described embodiments should not be interpreted as requiring such separation in all embodiments, and the described program components and devices are generally integrated together into a single software product or multiple software products or packaged in various software products.

While the disclosure has been shown and described with reference to various to embodiments thereof, it will be understood by those skilled in the art that various changes in form and details may be made therein without departing from the spirit and scope of the disclosure as defined by the appended claims and their equivalents.

What is claimed is:

1. Accelerated outdoor exposure test equipment comprising:
    a test chamber consists of a box comprising an artificial radiation source;
    a sun tracking device configured to change the accelerated outdoor exposure test equipment from a day exposure of sunlight to an artificial exposure of artificial light;
    a specimen holder which is disposed a specimen; and
    a radiometer wherein the radiometer is mounted to display the radiation exposure at a surface of the test specimen,
    wherein the specimen placed in the specimen holder is exposed to sunlight during daytime and exposed to artificial light of the artificial radiation source during nighttime,
    wherein the test chamber is disposed on an actuator moving along an axis or disposed on a tracking actuator to move the specimen holder in a lateral or longitudinal direction,
    wherein the artificial radiation source is disposed to provide maximum exposure uniformity,
    wherein the specimen holder is to provide the specimens with a backing, and when a space between the backing and the test specimen exists, the backing effects on the exposure result.

2. The accelerated outdoor exposure test equipment of claim 1, wherein the specimen includes a product formed of a polymer material or a portion of the product.

3. The accelerated outdoor exposure test equipment of claim 1, wherein the specimen placed in the specimen holder is exposed to the sunlight or the artificial light, as the specimen holder is moved in a lateral direction or a longitudinal direction at sunrise or sunset.

4. The accelerated outdoor exposure test equipment of claim 1, wherein the specimen placed in the specimen holder is exposed to natural weathering or laboratory weathering depending on exposure stages expressed in terms of a total solar or solar ultraviolet irradiation.

5. The accelerated outdoor exposure test equipment of claim 1, wherein the accelerated outdoor exposure test equipment further comprises:
    a humidity controller for the test chamber; or
    a water spray device configured to spray water on a surface of the specimen.

6. The accelerated outdoor exposure test equipment of claim 1, wherein the test chamber includes a screen to prevent bugs from the artificial radiation source.

7. The accelerated outdoor exposure test equipment of claim 1, wherein the test chamber or the specimen holder is moved depending on exposure cycles to natural light and the artificial light such that the specimen is exposed to the natural light and the artificial light.

8. The accelerated outdoor exposure test equipment of claim 1, wherein the artificial radiation source includes a metal halide lamp or an UVA-340 lamp.

9. The accelerated outdoor exposure test equipment of claim 1, wherein the accelerated outdoor exposure test equipment further comprises:
    a black-standard thermometer; or
    a black-panel thermometer.

10. The accelerated outdoor exposure test equipment of claim 1,
    wherein the specimen holder is made of non-oxidizing alloys of aluminum or stainless steel.

11. The accelerated outdoor exposure test equipment of claim 1, wherein an air temperature is monitored during an accelerated outdoor exposure test,
    wherein the air temperature is controled as not exceeding a specific temperature above 38° C., and
    when the artificial radiation source is disposed in front of the specimen.

12. Accelerated outdoor exposure test equipment comprising:
    a specimen holder which is disposed in an artificial radiation source to irradiate artificial light;

a sun tracking device configured to change the accelerated outdoor exposure test equipment from a day exposure of sunlight to an artificial exposure of artificial light;

a motor to operate the specimen holder; and a radiometer mounted to display the radiation exposure at a surface of the specimen, wherein the motor transfers the specimen holder in a first direction, in which a specimen to be tested is placed, such that the specimen is exposed to the artificial light at sunset, and transfers the specimen holder in a second direction different from the first direction such that the specimen holder is exposed to sunlight instead of the artificial light at sunrise, wherein the test chamber is disposed on an actuator moving along an axis or disposed on a tracking actuator to move the specimen holder in a lateral or longitudinal direction, wherein the artificial radiation source is disposed to provide maximum exposure uniformity, wherein the specimen holder is to provide the specimens with a backing, and when a space between the backing and the test specimen exists, the backing effects on the exposure result.

13. Accelerated outdoor exposure test equipment comprising:

a specimen holder consists of a box comprising artificial radiation source;

a specimen holder which is disposed a specimen for an accelerated outdoor exposure test;

a motor to operate the specimen holder; and a sun tracking device configured to change the accelerated outdoor exposure test equipment from a day exposure of sunlight to an artificial exposure of artificial light;

a radiometer mounted to display the radiation exposure at a surface of the specimen, wherein the motor is controlled to move the specimen holder towards a test chamber, such that the specimen is exposed to artificial light irradiated from the artificial radiation source at sunset, and wherein the motor is controlled to move the specimen holder out of the test chamber, such that the specimen holder is exposed to sunlight instead of the artificial light at sunrise, wherein the test chamber is disposed on an actuator moving along an axis or disposed on a tracking actuator to move the specimen holder in a lateral or longitudinal direction, wherein the artificial radiation source is disposed to provide maximum exposure uniformity, wherein the specimen holder is to provide the specimens with a backing, and when a space between the backing and the test specimen exists, the backing effects on the exposure result.

14. The accelerated outdoor exposure test equipment of claim 13, wherein the accelerated outdoor exposure test equipment further includes:

a water spray device configured to provide water to the specimen of the specimen holder.

15. The accelerated outdoor exposure test equipment of claim 13, wherein the specimen holder is titled at a specific angle during daytime, moved to be positioned on a plane at sunset, and then moved towards the test chamber after positioned on the plane.

16. The accelerated outdoor exposure test equipment of claim 13, wherein the specimen holder is positioned inside the test chamber during nighttime, moved out of the test chamber at sunrise, and then tilted at a specific angle from a plane state after moved out of the test chamber.

* * * * *